US007130903B2

(12) United States Patent
Masuda et al.

(10) Patent No.: US 7,130,903 B2
(45) Date of Patent: Oct. 31, 2006

(54) MULTI-LAYER CLASS IDENTIFYING COMMUNICATION APPARATUS WITH PRIORITY CONTROL

(75) Inventors: Michio Masuda, Tokyo (JP); Toshiaki Arikawa, Tokyo (JP); Kenshin Yamada, Tokyo (JP)

(73) Assignee: NEC Corporation, Tokyo (JP)

(*) Notice: Subject to any disclaimer, the term of this patent is extended or adjusted under 35 U.S.C. 154(b) by 691 days.

(21) Appl. No.: 09/752,520

(22) Filed: Jan. 3, 2001

(65) Prior Publication Data
US 2001/0007560 A1     Jul. 12, 2001

(30) Foreign Application Priority Data
Jan. 11, 2000    (JP)    ............... 2000-003041

(51) Int. Cl.
    *G06F 15/173*    (2006.01)
(52) U.S. Cl. .................. 709/225; 709/238; 370/235
(58) Field of Classification Search ............... 709/225, 709/230–238; 370/235, 230.1, 229–238, 370/389, 338
    See application file for complete search history.

(56) References Cited

U.S. PATENT DOCUMENTS

| 6,094,435 | A  | * | 7/2000  | Hoffman et al. ............. 370/414 |
| 6,286,052 | B1 | * | 9/2001  | McCloghrie et al. ........ 709/238 |
| 6,487,170 | B1 | * | 11/2002 | Chen et al. .................. 370/231 |
| 6,594,268 | B1 | * | 7/2003  | Aukia et al. ................. 370/400 |
| 6,633,575 | B1 | * | 10/2003 | Koodli ........................ 370/412 |
| 6,728,208 | B1 | * | 4/2004  | Puuskari ................... 370/230.1 |
| 6,798,743 | B1 | * | 9/2004  | Ma et al. ..................... 370/235 |
| 6,914,883 | B1 | * | 7/2005  | Dharanikota ............ 370/230.1 |
| 2002/0107908 | A1 | * | 8/2002 | Dharanikota ................ 709/203 |
| 2002/0188720 | A1 | * | 12/2002 | Terrell et al. ............... 709/225 |

FOREIGN PATENT DOCUMENTS

| JP | 2-87747       |   | 3/1990  |
| JP | 5-191455      |   | 7/1993  |
| JP | 7-154421      |   | 6/1995  |
| JP | 08-307454     | A | 11/1996 |
| JP | 9-205441      |   | 8/1997  |
| JP | 09-331348     | A | 12/1997 |
| JP | 10-23012      |   | 1/1998  |
| JP | 11-331257     | A | 11/1999 |
| WO | WO 98/28939   | A1 | 7/1998 |

OTHER PUBLICATIONS

Metz, Chris: IP QOS: Traveling in First Class on the Internet. IEEE Internet Computing, Mar./Apr. 1999, pp. 84-88.

(Continued)

Primary Examiner—Jeffrey Pwu
(74) Attorney, Agent, or Firm—Sughrue Mion, PLLC

(57) ABSTRACT

A multi-layer class identifying communication apparatus, includes an input interface connected to input communication lines; a switch circuit; and an output interface connected to output communication lines. The input interface comprises an allocating section which determines a class identifier indicative of one of classes to which an IP packet belongs, from header data of the IP packet received through one of the input communication lines, and allocates an IP-QOS (Internet-Protocol-Quality-of-Service) code to the IP packet. The switch circuit selects one of the output communication lines based on a destination address of the IP packet, such that the IP packet is outputted from the output interface to the selected output communication output interface.

10 Claims, 16 Drawing Sheets

OTHER PUBLICATIONS

Nichols, K.; Jacobsen; V.; Zahng, L.: A Two-bit Differentiated Services Architecture for the Internet. Network Working Group, RFC2638, Jul. 1999, pp. 1-30.

Floyd, Sally; Speer, Michael F.: Experimental Results for Class-Based Queueing. Nov. 1998, pp. 1-13.

* cited by examiner

Fig.6A

[CAM REGION DIVISION]

| CAM ADDRESS | CAM DATA (MAX.64 BITS) | MASK PATTERN (64 BITS) | SEARCH METHOD |
|---|---|---|---|
| ADDR_A~ | IP SRC PREFIX ENTRY STORAGE REGION | | LONGEST MATCH |
| ADDR_B~ | IP DST PREFIX ENTRY STORAGE REGION | | LONGEST MATCH |
| ADDR_Q~ | IP INFO SEARCH ENTRY STORAGE REGION | | FULL MATCH WITH MASK |

Fig.6B

[1, IP SRC PREFIX ENTRY STORAGE REGION : SEARCH CODE 0000]

| CAM ADDRESS (ADDR_A) | CAM DATA (38 BITS) | | | |
|---|---|---|---|---|
| | HW #(2) | SEARCH CODE(4) | IP SRC ADRESS/ PREFIX(32BITS) | NON USED(26 BITS) |
| A #1 | 00 | 0000 | IP SRC ADDRESS #1/PREFIX | |
| A #2 | 00 | 0000 | IP SRC ADDRESS #2/PREFIX | |
| A #3 | 01 | 0000 | IP SRC ADDRESS #1/PREFIX | |
| ⋮ | ⋮ | ⋮ | ⋮ | |

Fig. 7A

[2,IP DST PREFIX ENTRY STORAGE REGION : SEARCH CODE 0001]

| CAM ADDRESS (ADDR_B) | CAM DATA (38 BITS) | | | |
|---|---|---|---|---|
| | HW #(2) | SEARCH CODE(4) | IP DST ADDRESS/ PREFIX(32BITS) | NON USED(26 BITS) |
| B #1 | 00 | 0001 | IP DST ADDRESS #1/PREFIX | |
| B #2 | 00 | 0001 | IP DST ADDRESS #2/PREFIX | |
| B #3 | 01 | 0001 | IP DST ADDRESS #1/PREFIX | |
| ⋮ | ⋮ | ⋮ | ⋮ | |

Fig. 7B

[3,IP INFO ADDRESS ENTRY STORAGE REGION : SEARCH CODE 0010]

| CAM ADDRESS (ADDR_Q) | CAM DATA (55 BITS) | | | | | | | | |
|---|---|---|---|---|---|---|---|---|---|
| | HW #(2) | SEARCH CODE(4) | ADDR A(14) | ADDR B(14) | TOS (8) | PROTO COL# (8) | SRC/ DST (1) | PORT KEY (8) | NON USED (5 BITS) |
| Q #1 | 00 | 0010 | A1 | B1 | 01 | TCP | S | HTTP | |
| Q #2 | 00 | 0010 | A1 | B2 | 04 | UDP | D | SNMP | |
| Q #3 | 01 | 0010 | A3 | B1 | 02 | TCP | S | FTP | |
| ⋮ | ⋮ | ⋮ | ⋮ | ⋮ | ⋮ | ⋮ | ⋮ | ⋮ | |

Fig. 8

[IP INFO ENTRY]

| ADDRESS(16 BITS):<br>UPPER 2 BITS=00<br>LOWER 14 BITS=HIT ADDR_Q | DATA(24 BIT) | | | | | | |
|---|---|---|---|---|---|---|---|
| | Q_PRI(4) | D | P | ROUTE(1+4) | | OUTPUT TOS(2+8) | | RESERVE (3) |
| ADDR Q0 | 0000 | 0 | 0 | 0 | 0000 | 11 | 01101100 | |
| ADDR Q1 | 1101 | 0 | 1 | 0 | 0000 | 11 | 01101000 | |
| ADDR Q2 | 1101 | 0 | 0 | 0 | 0000 | 00 | 00000000 | |
| ..... | ..... | ..... | ..... | ..... | ..... | ..... | ..... | |
| ADDR QI | 1110 | 0 | 1 | 1 | 0101 | 00 | 00000000 | |
| ..... | ..... | ..... | ..... | ..... | ..... | ..... | ..... | |

Fig. 9

(IPV4 & TCP/UDP/OTHER HEADER FORMAT)

| WORD | 63 | 47 | 31 | 15 |
|---|---|---|---|---|
| - | EMPTY DATA | | PPP HEADER | |
| 0 | VER | IHL | TOS | DETAGRAM LENGTH | IDENTIFICATION | M | FRAGMENT OFFSET |
| 1 | TTL | | PROTOCOL | HEADER CHECKSUM | SRC IP ADDRESS | |
| 2 | DST IP ADDRESS | | L4 SRC PORT | L4 DST PORT |

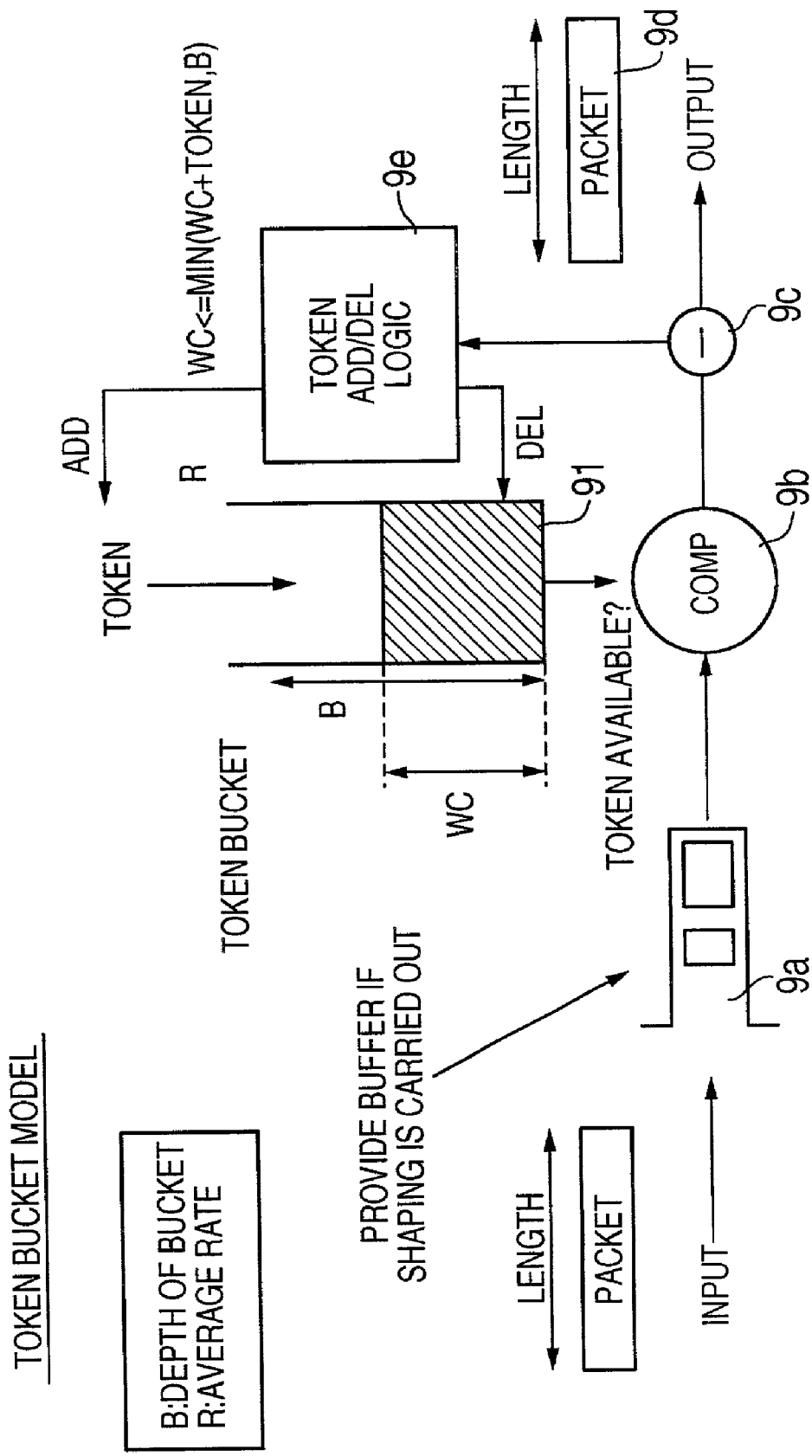

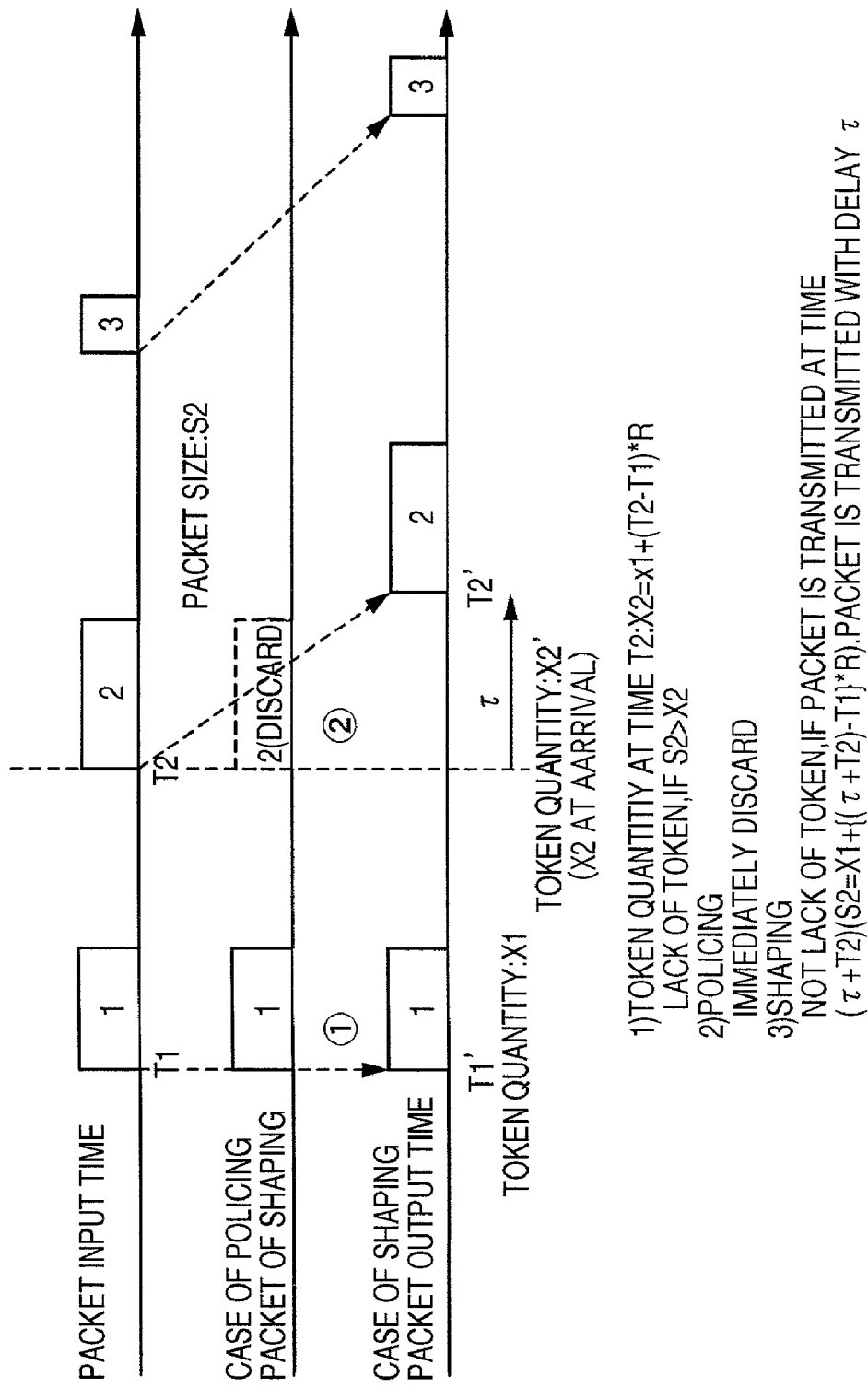

MULTI-LAYER CLASS IDENTIFYING COMMUNICATION APPARATUS WITH PRIORITY CONTROL

BACKGROUND OF THE INVENTION

1. Field of the Invention

The present invention relates to s multilayer class identifying communication apparatus used in an IP network of a network layer of an OSI reference model.

2. Description of the Related Art

Recently, the Internet, which is regarded as a de facto standard, has been standardized as a global network, based on Transmission Control Protocol/Internet Protocol (TCP/IP). Usually, in the seven layers of the OSI reference model, the IP serves as the network layer, and the TCP serves as the transport layer. Data is passed from the lowest layer Ethernet and token-ring network to the IP and passed from the TCP to the application layer.

A router as a relay device between local-area networks (LAN) is arranged between a repeater, a bridge, and a gateway. The router is used to accumulate frames sent from a communication line and transmit them to an appropriate communication line according to a network address included in the data of the frames.

A conventional router fairly handles all IP packets and basically does not perform priority control over IP packets. Each IP packet includes an IP address in its header and stays in a buffer of the router. Since the IP packet is read from the buffer by the first-in first-out (FIFO), no delay priority control is performed. When the IP packets converge to a certain output port, congestion occurs, thereby causing the discard of packets in the buffer of the router. Usually, no priority control is performed over the discard of packets.

In contrast, the known ATM technology introduces the concept of connection, in which a route connecting a source address and a destination address is clearly defined by a virtual path identifier/a virtual channel identifier (VPI/VCI). This concept permits the quality of service (QOS) such as delay characteristics and discard ratios, which is necessary for a connection unit to be defined. In addition, network apparatuses perform priority controls so that the QOS of connections are satisfied.

(IP-QOS)

Consideration is now given to technologies for easily performing priority control on the Internet. Typical examples are Intserve/Resource Reservation Setup Protocol (RSVP) as a protocol for performing the network band control, and Differentiated Service. The former simulates the concept of connection as introduced in the ATM, while the latter performs priority control based on packet data as much as possible.

The Intserve/RSVP system is not applicable to a large-scale backbone network at low cost. That is, the system lacks scalability, and it is thereby not widely used. In order to solve the problem, the Differentiated Service primarily considers scalability, availability at low cost, and adaptability to the high-speed performance of an optical carrier (OC)-48 class as an interface for a backbone network optical fiber according to transmission velocities.

The Differentiated Service guarantees quantitative service as in the ATM-QOS. Instead, from the viewpoint of the best effort, the Service sets a relative quality difference to facilitate the differentiation of service. This is accepted as a substantially practical solution judging from specification progress by the Internet engineering task force (IETF) as a Net-problem solving organization and vendor responses.

(Differentiated Service)

The Differentiated Service system has been discussed in the IETF, which regulates the Internet technologies. The Differentiated Service is a system for differentiating service levels, and does not guarantee the QOS. This is strictly for a relative priority control framework. That is, the Differentiated Service only defines the frameworks of QOS classes. The details of the QOS classes and scheduling formats between the QOS classes are referred to vendors and users.

(Service Classes in the Differentiated Service)

The Differentiated Service has three kinds of defined traffics (service classes) including an expedited forwarding service (EF class) as a premium service, an assured forwarding service (AF class), and a best effort service (BE class). The premium expedited forwarding (EF) class provides a virtual dedicated-line service such as an IP-CBR (constant bit rate) on an IP network. Thus, it is necessary to perform precise transmission control including usage parameter control (UPC) by additionally using a shaping section. Since the EF class is regarded as a class for a band guarantee service, it takes first priority over the assured forwarding service (AF class) and the best effort service (BE class), which will be described below.

Unlike the expedited forwarding (EF) class as the premium class, the assured forwarding service (AF) class is only for a relative priority control framework. The assured forwarding service has four kinds of delay classes and three kinds of discard classes. Delay priority control is performed by giving priority to an order in which IP packets in a network apparatus are transmitted. For example, this is effective in reducing the transmission delay of an application responsive to delay. Discard control is performed by giving priority to the discarding of packets in a place where congestion occurs in the network apparatus. The best effort service (BE class) is applied as a third traffic, besides the EF class and the AF class. Of the service classes, the lowest priority control is given to the BE class.

The above description outlines the Differentiated Service. However, the recommendation of the Differentiated Service is still in a state of flux. Thus, the definitions and usage described above can be changed.

In conjunction with the above description, a packet transmitting and receiving node is disclosed in Japanese Laid Open Patent application (JP-A-Heisei 2-87747). In this reference, the packet transmitting and receiving node is composed of a reception buffer, a header analyzing section, a reception packet storing section, a passage packet storage and analysis section, a generation packet storage and analysis section, a control section and a transmission switch. The reception buffer stores reception packets. The header analyzing section analyzes a destination and a service class from a header of each of the reception packets stored in the reception buffer. The reception packet storage section stores the reception packets from the reception buffer when the reception packets are destined to the node. The passage packet storage section stores the reception packets from the reception buffer when the reception packets are destined to other nodes. The generation packet storage analysis section stores and analyzes packets to be sent from the node to other nodes for every service class. The control section is given the number of packets and a packet generation time as the analysis results of the passage packet storage and analysis section and the number of packets and a packet generation time as the analysis results of the generation packet storage and analysis section, when referring to a priority level predetermined for the passage packet storage and analysis section and the generation packet storage and analysis section to determine a transmission order of the packets from the storage and analysis sections, and determines whether the number of packets stored in each storage and analysis section exceeds a predetermined storage limitation packet count and whether the difference between the packet generation time and a present time exceeds a predetermined delay limitation time for every storage and analysis section. The control section determines that the packet should be primarily sent with no relation to the priority level of the packet when the packet generation time or the number of packets exceeds the limitation. The transmission switch takes out the packet from the storage and analysis section to transmit it.

Also, a packet switching apparatus is disclosed in Japanese Laid Open Patent application (JP-A-Heisei 5-191455). In this reference, a routing operation to the whole packet switching network is carried out based on priority classes. A buffer is provided for every priority class, which is separately and independently allocated with a delay and a discard rate as a transmission quality. Packets stored in the buffer from a transmission line in relaying of packets are subjected to a classifying process of the packets. The number of packets after the classification is monitored and an estimation delay is calculated for every priority class. The packets with permissible long delays are set to have long routes for load distribution when load is rapidly increased. Packets with large discard rates are discarded. The packet switching apparatus is composed of line accommodating section and a control section. The line accommodating section has a routing table indicative of a route and discard instruction for every priority class for the above operations. The control section updates the routing table for every priority class based on delay data from the line accommodating section and switching apparatus status data of other stations.

Also, a switching apparatus is disclosed in Japanese Laid Open Patent application (JP-A-Heisei 7-154421). In this reference, data packets for at least two different priority classes are stored in buffers, respectively. Each of the buffers is allocated with a threshold value. The threshold value for a higher priority class is equal to or higher than that for a lower priority class. When a packet newly arrives the buffer, the priority level of the packet and an occupation rate of the buffer are determined. The occupation rate is compared with the threshold value for the buffer and the packet is stored in the buffer or discarded based on the comparing result. At least threshold value is dynamically controlled.

Also, a cell transfer control method is disclosed in Japanese Laid Open Patent application (JP-A-Heisei 9-205441). In this reference, when a connection belong to a specific traffic class with no band reservation is established, a discard priority data notified from a generation unit is stored in a node unit in correspondence to an identifier of the connection. A cell belonging to the specific traffic class is selectively discarded based on a predetermined discard condition which is determined a congestion state and the priority level when the route for the connection is in the congestion state.

Also, a transmission traffic control apparatus is disclosed in Japanese Laid Open Patent application (JP-A-Heisei 10-23012). In this reference, a data is transmitted in a fixed length packet or cell. A transmission traffic control apparatus is connected to a virtual path (VP) switch network and is composed of a header converting section, a control section, a transmission scheduler, and a read control section. The header converting section allocates an output side VPI/VCI value, which has been determined upon the establishment of the connection, and a class identifier corresponding to an in-apparatus class to a reception cell. The control section classifies the reception cell based on the VPI value and the class identifier given to an in-apparatus header to write a class queue. There are a usual class buffer and a variable class buffer. The transmission scheduler controls the maximum rate for every VP and a rate of the variable queue. The read control section reads out data from the class queue in response to an instruction from the transmission scheduler. The variable buffer includes a forward resource managing cell (FRM cell) inserting section for inserting a FRM cell. A receiving side apparatus connected via the VP switch network is composed of an FRM cell extracting section for extracting the FRM cell which has been inserted, means for monitoring the content of EFCI based on the content of the reception cell for every VP, a EFCI register for holding a latest EFCI data, a function for stamping the content of the EFCI resister on a congestion indication bit (CI) of a backward RM cell (BRM cell), and a BRM cell inserting section for inserting the BRM cell in a downstream. The transmission scheduler is composed of means for controlling the maximum rate for every VP, a control parameter, various parameters for controlling the variable class queue rate, and means for controlling the insertion of the FRM cell and the monitoring the reception of the BRM cell. Also, the transmission scheduler has a function to control a variable transmission rate in accordance with the reception of the RM cells and the congestion indication bit, and allocates a priority having a relation of (normal class)>(FRM cell)> (variable class) in a range to the maximum rate for every VP.

SUMMARY OF THE INVENTION

Therefore, an object of the present invention is to provide a multi-layer class identifying communication apparatus flexibly adaptable to the function of a router connecting local-area networks by changing only parameters in accordance to service classes in a network layer of an ATM network handling IP packets.

In order to achieve an aspect of the present invention, a multi-layer class identifying communication apparatus, includes an input interface connected to input communication lines; a switch circuit; and an output interface connected to output communication lines. The input interface comprises an allocating section, which determines a class identifier indicative of one of classes to which an IP packet belongs, from header data of the IP packet received through one of the input communication lines, and allocates an IP-QOS (Internet-Protocol-Quality-of-Service) code to the IP packet. The switch circuit selects one of the output communication lines based on a destination address of the IP packet, such that the IP packet is outputted from the output interface to the selected output communication output interface.

Here, the allocating section specifies a priority traffic based on an optional combination of the IP header and values of a plurality of fields of a TCP header.

Also, the multi-layer class identifying communication apparatus may further include a scheduler controls the switch circuit for a scheduling operation to the IP packet. At that time, the scheduler can carry out WRR (Weighted Round Robin Scheduling) method and a fixed priority scheduling method as a class scheduling method, and can select the fixed priority scheduling method for the IP packet of the class based on the class identifier. In this case, the scheduler controls the switch circuit based on the IP-QOS code.

Also, the multi-layer class identifying communication apparatus may further include a queue managing section which manages a queue such that a plurality of IP packets can be shared in units of the IP-QOS codes.

Also, each of the input interface and the output interface may monitor traffic in units of the IP-QOS codes to restrict excessive traffic.

Also, the class identifier may include three kinds of service class of an EF (Expedited Forwarding (Premium service)) class, an AF (Assured Forwarding Service) class, and a BE (Best Effort Service) class.

Also, the input interface may include an IP packet receiving section which extracts the header data and TCP header data of the IP packet; a class identifier memory; an IP-QOS class determining section which refers to the class identifier memory to determine the class identifier, using the header data of the IP packet as a search key; a reception side control section which carries out a priority control to the IP packet that a destination has been specified, based on the IP-QOS code and IP packet data of the IP packet; and a reception side switch interface which carries out the priority control and issues a transmission request to the output interface in units of the class identifiers. At this time, the IP-QOS class determining section monitors a coming traffic which exceeds a transmission permissive capacity which is set for every IP-QOS class, carries out a discarding operation of IP packets of the coming traffic or a policing operation to lower transmission priorities of the IP packets of the coming traffic, when the coming traffic exceeds the transmission permissive.

Also, the output interface may include a payload memory; a FIFO memory; a transmission side switch interface which receives the IP packet from the input interface to store in the payload memory, and generates IP packet data to write in the FIFO memory; IP-QOS class scheduler which carries out a scheduling function and a queuing operation based on IP-QOS class code to primarily issue a transmission request such that the IP packet is transmitted with a priority; a transmitting section which transmits the IP packet transferred from the input interface to a data link layer and a network access layer; and a transmission side control section which control the transmitting section based on the priority. In this case, the scheduling function may be based on WRR (weighted round robin) method.

In another aspect of the present invention, a method of controlling a transmission of an IP packet flow, is attained by determining a class identifier indicative of one of classes to which an IP packet belongs, from header data of the IP packet received through one of input communication lines; by allocating an IP-QOS (Internet-Protocol-Quality-of-Service) code to the IP packet; and by selecting one of output communication lines based on a destination address of the IP packet, such that the IP packet is outputted from the output interface to the selected output communication output interface.

Here, the allocation may be attained by specifying a priority traffic based on an optional combination of the IP header and values of a plurality of fields of a TCP header.

Also, the method may further include scheduling transfer of the IP packet using one of a WRR (Weighted Round Robin Scheduling) method and a fixed priority scheduling method. In this case, the scheduling may be carried out based on the IP-QOS code.

Also, the method may further include managing a queue such that a plurality of IP packets can be shared in units of the IP-QOS codes.

Also, the method may further include monitoring traffic in units of the IP-QOS codes to restrict excessive traffic.

Also, the class identifier may include three kinds of service class of an EF (Expedited Forwarding (Premium service)) class, an AF (Assured Forwarding Service) class, and a BE (Best Effort Service) class.

Also, the determination may be attained by extracting the header data and TCP header data of the IP packet; by referring to a class identifier memory to determine the class identifier, using the header data of the IP packet as a search key; by carrying out a priority control to the IP packet in which a destination has been specified, based on the IP-QOS code and IP packet data of the IP packet; and by transferring the IP packet in units of the class identifiers.

Also, the method may further include monitoring a coming traffic which exceeds a transmission permissive capacity which is set for every IP-QOS class; and carrying out a discarding operation of IP packets of the coming traffic or a policing operation to lower transmission priorities of the IP packets of the coming traffic, when the coming traffic exceeds the transmission permissive.

Also, the selection may be attained by carrying out a scheduling function and a queuing operation to the IP packet based on IP-QOS class code such that the IP packet is transmitted with a priority; and by transmitting the IP packet transferred from the input interface to a data link layer and a network access layer based on the priority. In this case, the scheduling function may be based on WRR (weighted round robin) method.

BRIEF DESCRIPTION OF THE DRAWINGS

FIGS. 6A and 6B are a diagram showing a table structure of a CAM region division according to the present invention and a diagram showing the structure of an IP Src Predix entry storage region;

FIGS. 7A and 7B are a diagram showing a table block structure of the IP Src Prefix entry storage region according to the present invention, and a diagram showing the structure of the IP Src Predix entry storage region;

FIG. 8 is a diagram showing a table block structure of an IPINFO entry storage region according to the present invention;

FIG. 9 is a diagram showing a format of IPv4 & TCP/UDP/Other Header used in the present invention;

FIG. 15 is a diagram showing policing and shaping in a token-bucket model according to the present invention; and FIG. 16 is a diagram of the policing and shaping operation according to the present invention.

DESCRIPTION OF THE PREFERRED EMBODIMENTS

Hereinafter, a multi-layer class identifying communication apparatus of the present invention will be described below in detail with reference to the attached drawings.

<The First Embodiment>

(1) Structure

Figure 1:
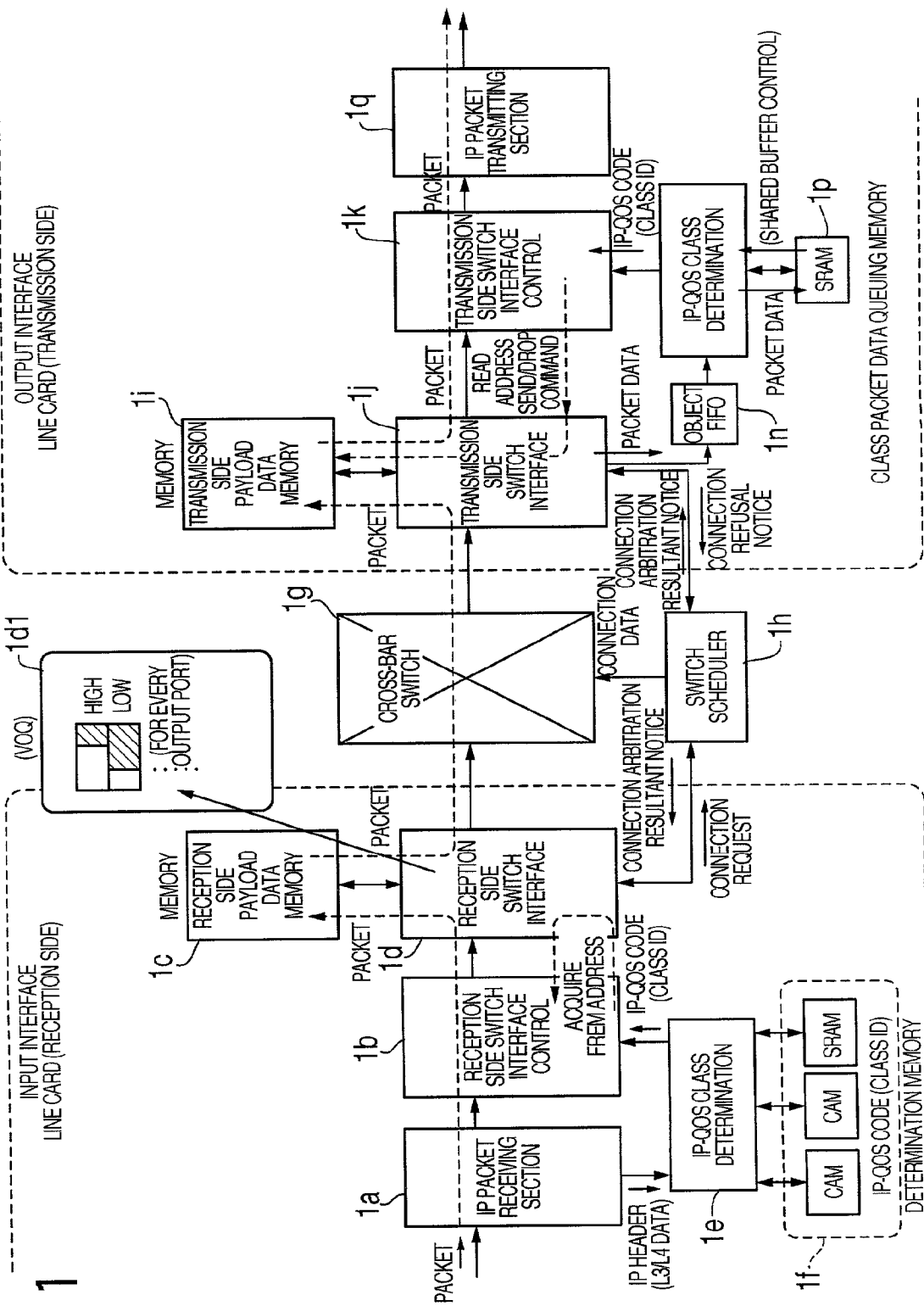
FIG. 1 is a block diagram showing a structure of a multi-layer class identifying communication apparatus according to the present invention.

FIG. 1 is a block diagram showing the structure of a multi-layer class identifying communication apparatus according to the present invention. The communication apparatus is composed of input/output interface line cards, an N×N cross-bar switch ($1g$), and a switch scheduler ($1h$).

The input interface line card is composed of an IP packet receiving section $1a$, a reception-side switch interface control section $1b$, a reception-side switch interface $1d$, a reception-side payload memory $1c$, an IP-QOS class determining section $1e$, and an IP-QOS code determination memory $1f$. The output interface line card is composed of a transmission-side switch interface $1j$, a transmission-side switch interface control section $1k$, an IP-QOS class scheduler $1m$, a class packet data queuing memory $1p$, and an IP packet transmitting section $1q$.

In this case, the input interface line card and the output interface line card are used. This is because card blocks having required members are attached to the cross-bar switch $1g$ switching from a source address to a destination address. However, these interface line cards may be simply provided as an input interface and an output interface. The multi-layer class identifying communication apparatus includes input/output interfaces and a switch scheduler $1h$ in addition to the cross-bar switch $1g$. In addition, the communication apparatus may have a simpler structure including neither the cross-bar switch $1g$ nor the switch scheduler $1h$ that controls the switching of the cross-bar switch $1g$. In this case, the functions and software programs in accordance with the embodiments of the present invention may be applied to a router handling IP packets on the Internet and supporting from physical layer to a network layer and a bridge having the functions of the physical layer and a data link layer and filtering the IP packets.

(Input Interface Line Card)

In the input interface line cards on the reception side, the IP packet receiving section $1a$ extracts IP packet header data and TCP/UDP header data contained in an upper layer than a layer for the IP packet header data from packet data of each of the IP packets obtained by dividing a packet in a application layer based on TCP of a transport layer as layer 4 in the OSI reference model. The extracted data are transmitted to the IP-QOS class determining section $1e$.

The IP packet receiving section $1a$ retrieves various kinds of conditions defined based on the contents of CAMs or a SRAM based on the received IP packet data from the IP packets. In addition, as actions satisfying the conditions, the IP packet receiving section $1a$ carries out a set of processes such as a queue priority control process, a filtering process (discarding/passing process), a SW priority/non-priority control process, and addition of a DSCP value of Differentiated Service.

The IP-QOS class determining section $1e$ accesses to the IP-QOS code (class identifier) determination memory $1f$ to acquire a class identifier, using as a retrieval key the header data of the received IP packet as a combination of the data of the layer 3 typified by the IP header and the data of the layer 4 typified by TCP/UDP headers, which is located above the layer 3. The IP-QOS class determining section $1e$ notifies the class identifier of the IP-QOS code to the reception-side switch interface control section $1b$.

The IP-QOS class determining section $1e$ monitors incoming traffic exceeding a transmittable capacity preset for each IP-QOS class. When the traffic exceeds the preset transmittable capacity, the IP-QOS class determining section $1e$ carries out policing control such as discarding of packets having IP-QOS codes or reducing the transmission priority of the packets. With these functions, the IP-QOS class determining section $1e$ determines the transmission frequency of packets in accordance with a network resource quantity allocated for the IP-QOS code of each of the packets.

The reception-side switch interface control section $1b$ carries out priority control to the cross-bar switch $1g$ by using the packet data received from the IP-packet receiving section $1a$ and an IP-QOS class code corresponding to the packet and determined by the IP-QOS class determining section $1e$.

The reception-side switch interface $1d$ controls sending requests for every class and every output interface card. The reception-side switch interface $1d$ usually transmits a transmission request having a high priority to the switch scheduler $1h$. This priority control corresponds to the reading of packets from the reception-side payload memory $1c$ to the cross-bar switch $1g$ and called delay priority control. The reception-side switch interface $1d$ outputs the IP packets to the cross-bar switch $1g$ for selecting/connecting destination addresses.

The reception-side payload data memory $1c$ stores the input IP packet data and empty packet data required when the IP packet is transmitted.

(Output Interface Line Card)

The transmission-side switch interface $1j$ stores the packet data received from the cross-bar switch $1g$ in the transmission-side payload memory $1i$ and simultaneously generates packet data corresponding to the stored packet data to write in an FIFO memory $1n$. The packet data has a virtual processing unit defined for each packet unit in a network apparatus, and is hereinafter referred to as an "object". The object is not the packet data, and is defined to prevent the packet data from being carried around in the apparatus. Packet transmission is carried out by passing the object in the apparatus.

The FIFO memory $1n$ transmits packet header data from the transmission-side switch interface $1j$ in a first-in first-out manner while keeping a predetermined delay time.

The IP-QOS class scheduler $1m$ carries out queuing for each class based on IP-QOS class codes contained in objects. The IP-QOS class codes correspond with a plurality of delay classes and a plurality of discard classes. An object stored in a queue having a high delay priority is preferentially transmitted to the transmission-side switch interface control section $1k$. The IP-QOS class scheduler $1m$ has a scheduling function based on the Weighted Round Robin (WRR) system to control in such a manner that a required service quality can be provided. In addition, on the IP network, precise transmission control including usage parameter control (UPC) and a shaping section is carried out to a premium service class providing a virtual dedicated line.

The transmission-side switch interface control $1k$ outputs IP packets from the transmission-side switch interface $1j$ to the IP packet transmitting section $1q$ in the order of scheduling based on the priority of the IP-QOS class scheduler $1m$.

The IP packet transmitting section $1q$ outputs the IP packets to the lower layers such as the data link layer and the network layer including the Ethernet and token-ring networks.

(2) Functions

Figure 2:
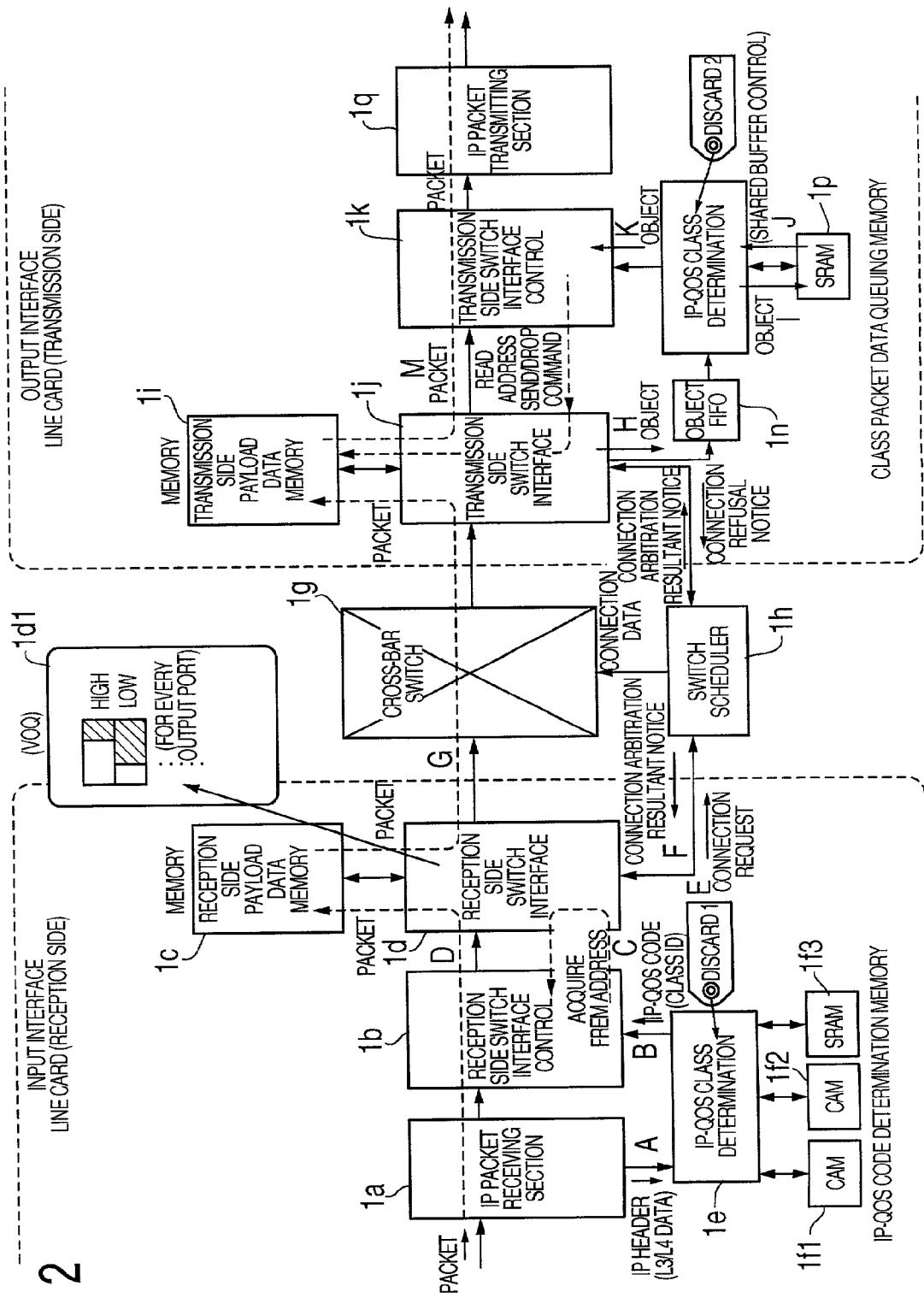
FIG. 2 is a diagram showing an operation of the multi-layer class identifying communication apparatus according to the present invention.

FIG. 2 illustrates the functions of the communication apparatus in accordance with the present invention. An example of the priority control applied in the present invention will be described using the structure of the communication apparatus shown in FIG. 1.

First, the IP-QOS class determining section $1e$ accesses to the CAM/SRAM to determine IP-QOS class codes stored in an apparatus by using the predetermined data of the layer 3 or the layer 4 as a retrieval key. In this case, the IP-QOS class determining section $1e$ supports both Behavior Aggregate (BA) classifier/Multi-Field (MF) classifier.

Regarding the addition of EF class and policing control, the IP-QOS class determining section $1e$ supports a policing function carried out to the determined IP-QOS classes (EF, AF1 to AF4, and BE). The policing control is the comparison between the token length of each class and the length of a transmitted packet. When the token length is shorter than the data packet length, the packet is discarded.

The IP-QOS class determining section $1e$ transmits IP-QOS codes (class identifiers) to the reception-side switch interface control section $1b$. The IP-QOS code determination memory $1f$ divides the IP-QOS codes, for example, into 16 kinds (5×3+1) of (EF. H), (AF1 to AF 4. H/M/L), and (BE. H/M/L) as delay classes and discard classes. The IP-QOS code (class identifiers) acquires the address of an empty area between the reception-side switch interface control section $1b$ and the reception-side switch interface $1d$.

The IP-QOS class scheduler $1m$ functions as a IP-QOS class unit scheduler, and carries out a process of outputting to the transmission-side switch interface control (1K) from the object of a high priority class EF>(AF1 to AF4/BE), for scheduling based on the IP-QOS class (in-apparatus QOS code) determined on the reception side. It should be noted that (AF1 to AF4/BE) carries out the scheduling based on the WRR system.

In the discard control by the IP-QOS class scheduler $1m$, the scheduler $1m$ compares the thresholds of the three classes of H/M/L with a buffer length to carry out the discard control (the generation of a drop object) with respect to AF1 to AF4/BE. Regarding EF, the IP-QOS class scheduler $1m$ supports by adding one class of H.

In terms of additions to the EF class and a shaping function, s shaping (delay scheduling) function is carried out to a determined IP-QOS class (only the EF class). The shaping control is a token-bucket system equivalent to the policing control. In this system, the token length of each class is compared with the length of a packet to be transmitted. When the token length is shorter than the packet length, the transmission of the packet is postponed.

The IP-QOS class scheduler $1m$ uses the class object queuing memory SRAM $1p$ to carry out the scheduling of objects.

(Priority control)

As the switching priority control of the apparatus, the following four processes are assumed.

(1) Mapping into an in-apparatus delay class by the reception-side switch interface control section $1b$.

The mapping into the in-apparatus delay class is a method for transmitting a transmission request. In this method, designation of delay priority control for the two classes (H/L) leads six delay classes.

Before transmitting of a packet to an output IF line card on the transmission side, the reception-side switch interface $1d$ issues a connection request to the switch scheduler $1h$. The switch scheduler $1h$ arbitrates transmission requests from input line cards and notifies the connection data of input/output paths to the cross-bar switch $1g$. In addition, the scheduler $1h$ issues a connection arbitration resultant notice to each of the input line cards on the reception side.

The reception-side switch interface $1d$ controls the requests of each class and each output IF card. The reception-side switching interface $1d$ primarily transmits a high priority request to the switch scheduler $1h$ usually. The priority control corresponds to the reading of packets from the reception-side payload data memory $1c$ for the cross bar switch $1g$, and this is regarded as delay priority control.

In the case of mapping into the in-apparatus delay class, the reception-side switch interface control $1b$ positioned on a previous stage of the reception-side switch interface $1d$ determines the delay priority in accordance with the traffic classes of packets. In FIG. 2, in order to match with the number of classes compliant with the Differentiated Service, six kinds of delay priority classes are determined as the traffic classes of packets. In this figure, there is shown an example corresponding with the two kinds (High/Low) of class queues with respect to the cross-bar switch $1g$.

(2) Mapping into a discard class carried out when an input packet is written in the reception-side payload memory $1c$.

In the mapping into the discard class, in order to acquire the address of an empty area (a free page address), the discard priority control of three kinds of classes (H/M/L) are designated. In this manner, the three kinds of discard classes correspond with the EF class.

When the input packet is written in the reception-side payload data memory $1c$, the reception-side switch interface control section $1b$ positioned in the previous stage of the payload data memory $1c$ acquires the address of the empty area (free page address) in the reception-side payload data memory $1c$. With the use of the free page address, the input packet is written in the reception-side payload data memory $1c$.

Concerning the acquisition of the empty-area address, the reception-side switch interface $1d$ has a few kinds of priorities. For simple description, FIG. 2 shows an example in which three kinds of discard classes (H/M/L) are used.

The reception-side switch interface $1d$ monitors the capacity of the empty area of the reception-side payload data memory $1c$. When the capacity is smaller than a predetermined high threshold, the reception-side switch interface $1d$ permits only the writing of a high priority packet. When the capacity is smaller than a predetermined low threshold, the reception-side switch interface $1d$ permits only the writings of an intermediate priority packet. Except for these cases, the reception-side switch interface $1d$ permits the packets of any classes to be written in the memory. This is discard control to the memory $1c$. The discard control is brought into correspondence with the three kinds of discarded traffic classes.

(3) The priority control carried out when an output packet is read out from the transmission-side payload memory 1*i* (delay priority control).

The reading of a packet from the transmission payload data memory 1*i* is controlled by the IP-QOS class scheduler 1*m*, the transmission-side switch interface control 1*k*, and the transmission-side switch interface 1*j*.

The priority control of the communication apparatus is the control of an order in which packets are read out from the transmission-side payload data memory 1*i*, and is comparable to delay priority control. The delay priority control handles six kinds of delay classes having IP-QOS codes.

(4) Priority control carried out when a packet transmitted from the cross-bar switch is written in the transmission-side payload data memory (discard priority control).

The packet transmitted from the cross-bar switch 1*g* is written in the transmission-side payload memory. The data of the written packet is notified as objects to the IP-QOS class scheduler 1*m*. The IP-QOS class scheduler 1*m* controls queue lengths by classes in the transmission-side payload data memory. Thus, the IP-QOS class scheduler 1*m* compares the queue length with the threshold of the discard class to determine whether packets contained in the transmission-side payload memory are discarded or not. As a result, this corresponds to the discard class of the traffic class.

The transmission-side switch interface control section 1*k* carries out packet transmission/packet discard by using two kinds (transmission/discarding) of objects. In the transmission of a packet, a packet residing in an FSU memory is read out and transmitted in response to a read command. In the case of discarding a packet, a packet residing in the FSU memory is discarded in response to a drop command.

(IP-QOS Class Determining section)

Figure 3:
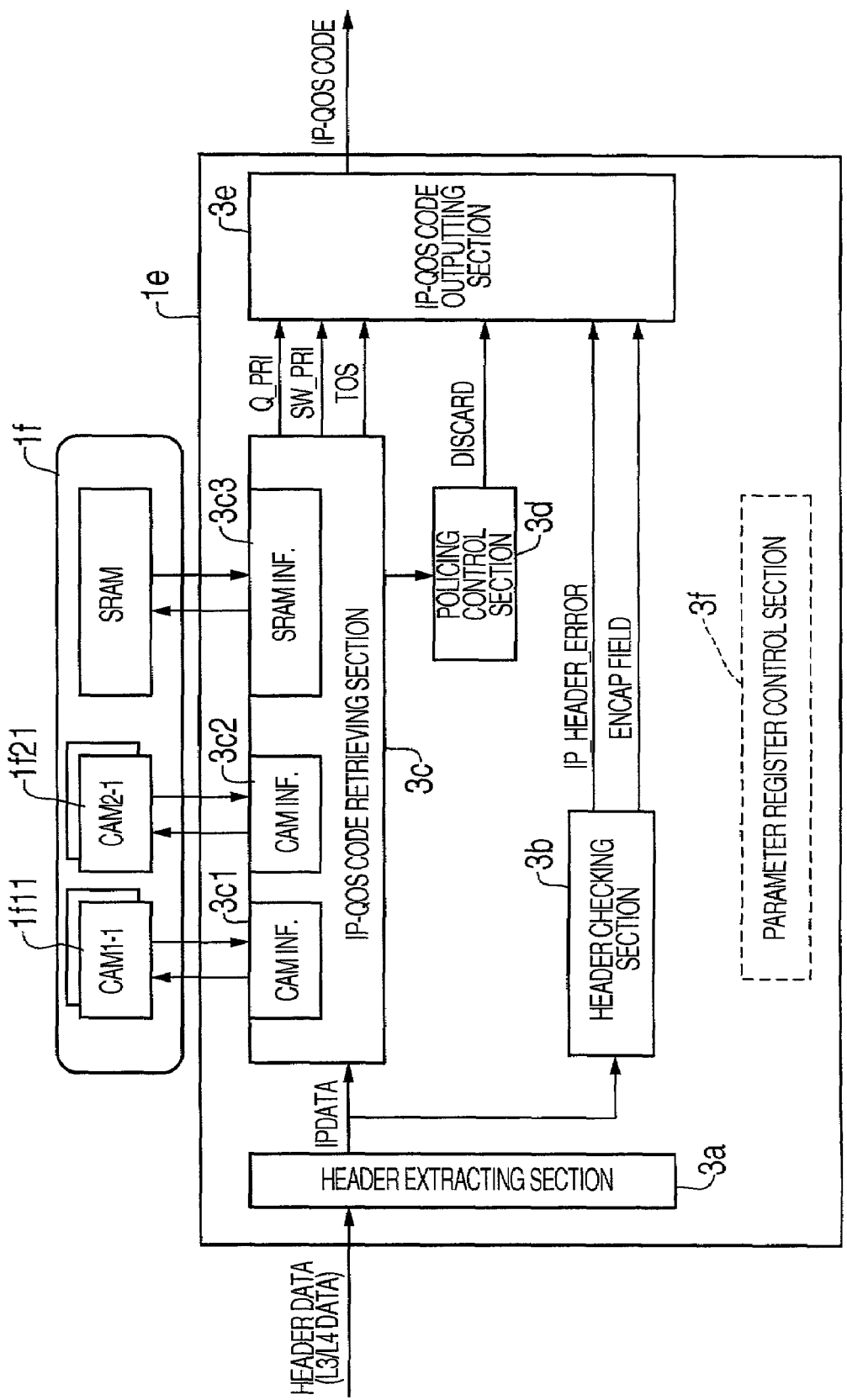
FIG. 3 is a diagram showing a main portion of an IP-QOS class determining section according to the present invention.

FIG. 3 illustrates the main part of the IP-QOS class determining section 1*e*. The details of the IP-QOS class determining section 1*e* will be described with reference to FIG. 3.

As shown in the figure, the IP-QOS class determining section 1*e* is composed of a header extracting section 3*a*, a header checking section 3*b*, an IP-QOS code search section 3*c*, a policing control section 3*d*, an IP-QOS code output section 3*e*, and a parameter register control section 3*f*.

The header extracting section 3*a* extracts predetermined data from the formats of the IP header and TCP/UDP header of IPv4 shown in FIG. 9, and transmits field values included in the extracted data as IP data to the IP-QOS code search section 3*c*. In FIG. 9, a densely hatched section (Ver) shows a field to be checked. Also, roughly hatched sections (TOS, Src IP Address, Dst IP Address, L4 Src Port, and L4 Dst Port) show fields for specifying classes as objects of a search key.

The extracted data includes a 4-bit version (Ver), an 8-bit TOS (type of service) identifier, a source (Src) IP address, a destination (Dst) IP address, a L4 Src port number of a layer 4 header, and a L4 Dst port number of the layer 4 header. An Internet header length (IHL) indicates the size of the IP header, a datagram length indicates the total length of the entire packet including the IP header and IP data, and an identification indicates an identifier restoring a fragment. Also, a Flag M is composed of 3 bits, a 13-bit fragment offset indicates the location of a fragment after division in original data, and a time to live indicates a time during which the presence on a network is permitted. In addition, a protocol specifies the upper layer protocol, and a header checksum indicates the check sum of the IP header.

The IP header checking section 3*b* checks the normality of the IP header and outputs the result of an IP Header Error or Encap Field to the IP-QOS code output section 3*e*. The IP-QOS code search section 3*c* accesses a Contents Addressable Memory (CAM) and SRAM using data received from the header extracting section 3*a* as a search key to determine an IP-QOS code. The determined IP-QOS code includes data concerning a class identifier of the apparatus, priority in switching control, and so on.

The policing control section 3*d* monitors the traffic of each class determined by the IP-QOS code search section 3*c* positioned at the previous stage to control or restrict an excessive traffic flow. In this processing, the token-bucket system is used to monitor traffic violation or over-transmission. In the token-bucket system, a token quantity contained in a bucket increase with a ratio calculated based on an expression: T (elapsed time)×r (average rate). Even though a packet is received, when there are not present tokens giving a length enough to contain the received packet, the packet is discarded. In the above processing, the length of a packet is compared with a token length. When the token length is shorter than the packet length, the value of the discard bit is set to be "1" to indicate the packet to be discarded, and the packet is transmitted to a rear-stage block. In contrast, in case of "token packet length", the value of discard bit is set to be "0". This is a simple logic processing. In order to quickly determine whether the traffic violation is caused or not, the following method may be employed when producing and adjusting hardware and software.

The condition for passing an input packet is set to be "token 0" instead of "token packet length".

After transmission of the packet, the quantity corresponding with the size of the packet is subtracted from the present quantity of tokens. As a result, the token quantity may be a negative. When it is a negative value, the transmitted packet is regarded as an object causing traffic violation. With the use of the determination circuit, it is possible to determine whether the transmitted packet is a traffic violation object or not only based on token code data (1-bit data). That is, the present circuit has the simple structure.

The IP-QOS code output section 3*e* carries out the re-timing of an IP-QOS code determined by the IP-QOS code search section 3*c*, a filtering bit from the policing control section 3*d*, and error data from the header checking section 3*b* to output to the rear-stage reception-side switch interface control section 1*b*. An operator determines how to combine fields included in the mapping (MF/BA classifier) IP headers of traffic classes and how to make the combined fields correspond with the traffic classes. These issues are not specified in the recommendation of RFC of the IFTF. In order to make the above correspondence with the traffic classes possible, it is necessary to carry out the mapping of traffic classes based on arbitrary combination of extracted header data.

For example, when priority control is carried out to specified IP traffic between certain contract users, the classification of traffic classes is carried out based on the combination of a source (Src) IP address and a destination (Dst) IP address. In the specified IP traffic, when priority control is carried out to only the traffic of HTTP (the protocol for exchanging hypertexts with a WWW server on the Internet), it is necessary to classify the traffic class by combining a Src Port number and a Dest Port number contained in the header of the upper layer. In addition, when priority control is carried out to only the traffic transmitted from a certain server, it is necessary to classify the traffic classes by referring to only an Src IP address as the IP address of the server and an Src Port number. As shown here, when the traffic classes are classified based on a combination the plurality of fields of the IP header and the upper layer, this method is called a multi-field (MF) classifier.

Other than the above method, there is a classifying method called a behavior aggregate (BA) classifier. The BA classifier classifies traffic classes by referring to only the TOS field of the IP header. The TOS field defined in the IP header is a special field defined for the Differentiated Service. The TOS field is used to reduce a procedure for classifying the traffic classes based on a combination of fields of the IP header in a router. That is, an upper-stage router classifies the traffic classes based on the fields of the IP header and adds the class data to the TOS field to be transmitted. Next-stage routers subsequent to the upper-stage router only need to carry out priority control to each traffic class by referring to only the TOS fields. Vendors, however, need to determine how to use the TOS fields. Thus, it is necessary to connect the apparatuses of the same affiliates (vendors) to each other or there are provided restrictions in that operational rules need to be established between adjacent routers. As shown above, mapping of the traffic class requires that registrations are permitted in accordance with various kinds of combinations of arbitrary fields. In the present invention, the MF classifier and the BA classifier can be simultaneously supported by the following method.

(Operation of the Class Search Section)

The operation of the class search section will be described with reference to FIGS. 4 and 5.

Figure 4:
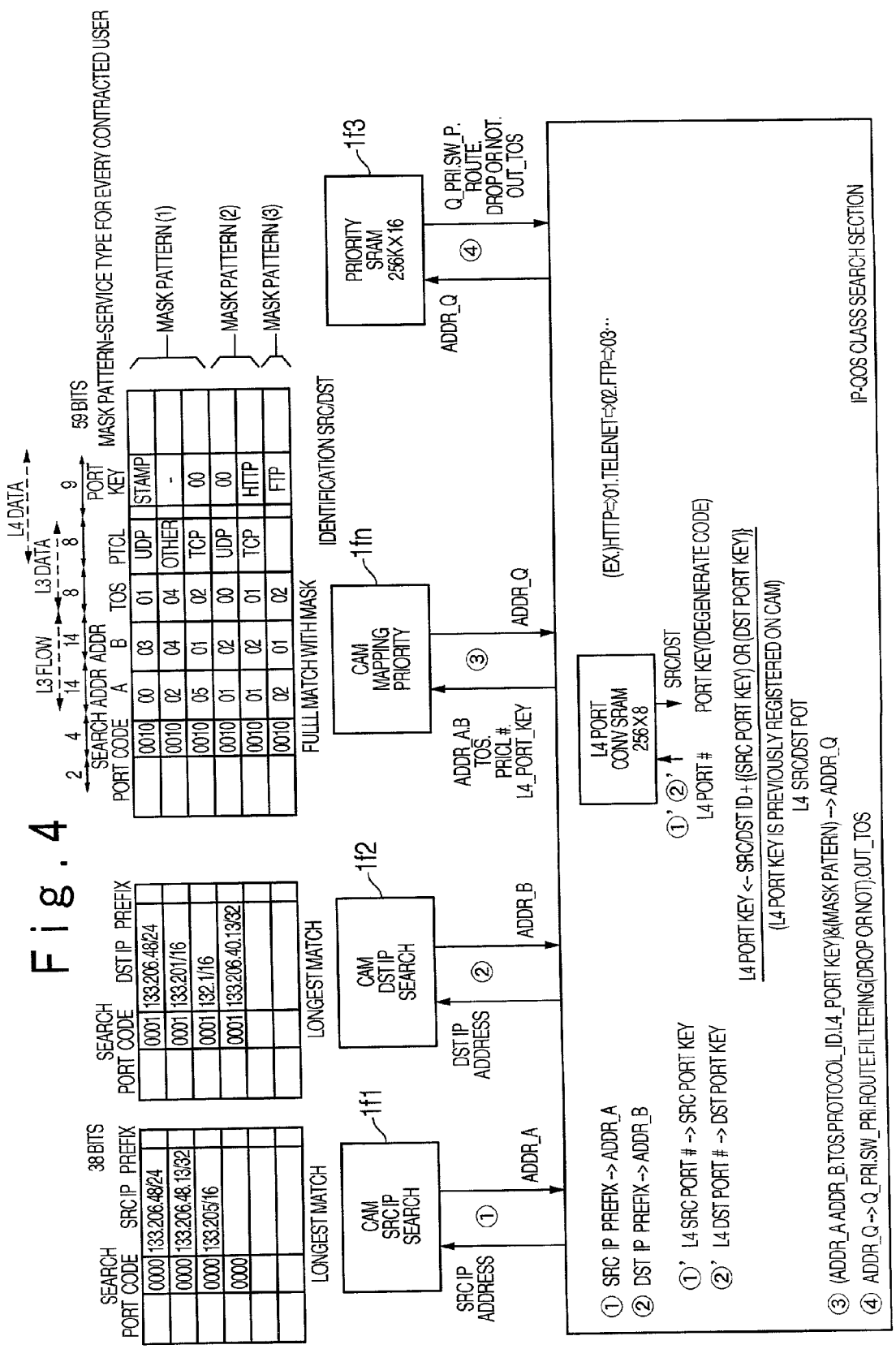
FIG. 4 is a diagram showing an operation of a class search section according to the present invention.

FIG. 4 shows the structure and operation of the class search section 3c. FIG. 5 shows a searching operation flow. As shown in FIG. 4, the IP-QOS class search section 3c is composed of a layer 4 (L4) port converting SRAM, a source IP address search CAM, a destination IP address search CAM, a priority mapping search CAM, and a priority setting SRAM. With this structure, IP-QOS class search section 3c extracts software priority control data. In addition, the flow chart shown in FIG. 5 includes a CAM search section inputting the source IP address, the destination IP address, a TOS identifier, and a protocol, to output a searched address Q, and a SRAM access section inputting the searched address Q, the upper layer TCP source port, and the upper layer TCP destination port to output an IP-QOS code.

In this situation, the conditions data is mainly described on the CAM, and the action data is described on the SRAM. The actions described on the SRAM correspond with the conditions described on the CAM. Thus, disposing both CAM and SRAM as recording mediums is not necessarily a requirement. However, considering the high-speed operation of the SRAM, the CAM may be formed by dividing the memory area of the SRAM. In this case, it is primarily necessary to apply an implementation method for effectively using the resource (area: the number of entries) of the CAM.

As described above, the MF classifier classifies traffic classes based on the arbitrary combinations of an Src IP address, a Dst IP address, an Src Port number, a Dst Port number, a protocol number, and a TOS. Regarding the MF classifier, the simplest searching method is a method in which the values of a Src IP address, a Dst IP address, a Src Port number, a Dst Port number, a protocol number, and a TOS field are set as registered data on the CAM capable of designating a mask for each entry, and the searching operation is carried out based on the packet header data every time a packet is input. However, since there are restrictions on the bit width of the CAM, practical ideas for implementation are needed.

The present invention has a sequence for acquiring an IP-QOS code by using the general-purpose CAM and the following two-stage searching method. The BA classifier carries out the process of converting to an IP-QOS code by referring to only TOS fields in the same framework as the process carried out by the MF classifier. That is, the process by the BA classifier can be regarded as a case in which only the TOS fields are usable in the case of the MF classifier. Considering the configuration of the CAM, it is possible to operate using both classifiers.

First, as a prior processing, fields are degenerated into key values to be registered in the CAM and the SRAM. Next, as a classification process, entries as the registered key values are searched on the CAM.

A detailed explanation will be given below with reference to FIGS. 4 and 5.

(Prior Registration in the CAM)

Prior Processing 1: the registration/degeneration of a Src IP address shown in step ① of FIG. 4

In advance, all Src IP addresses/prefixes included in the entries for classification are registered. In the prior process, when the Src IP address and the Dst IP address are degenerated, the Src IP address is used as a search key to carry out the searching operation by use of the longest prefix match under regulations based on the classless inter domain routing (CIDR). A CAM address obtained through the searching operation is set as the address A. When no key value is registered, all "0s" are a value indicating the address A. This process is equivalent to step S1 shown in FIG. 5.

Prior Processing 2: the registration/degeneration of a Dst IP address shown in a step ② of FIG. 4

Similar to the prior processing 1, in advance, all Src IP addresses/prefixes included in the entries for classification are registered. The Dst address is used as a search key to carry out retrieval by the longest prefix match. A CAM address obtained by the searching operation is set as Addr_B. When no key value is registered, all "0s" are the value of the Addr_B. This process is equivalent to the process of step S2 shown in FIG. 5. When the CAMs are connected in parallel to each other, steps S1 and S2 shown in FIG. 5 can be carried out in parallel.

Prior Processing 3: the registration/degeneration of port numbers (the data of the layer 4 shown in steps ①' and ②' of FIG. 4. The purpose of the processing 3 is to classify the application of the layer 4 from the Src port number or the Dst port number to degenerate into a predetermined key value. The port numbers are classified into well-known port numbers defining the protocol of the layer 4 and numbers arbitrarily added by terminals. In the normal layer 4 application, the well-known port number of the layer 4 application executed by a server is added to the Dst port number of a packet routed to a server from a client. The well-known port number is registered in a memory (table). The well-known port numbers required in operation are limited to a few kinds of numbers (HTTP, TELNET, FTP, etc.). Thus, only a small amount of memory (256×8=2064 bit) is needed.

In the processing 3, the port number is used as the address and access is carried out to the memory for converting from the port number to a key value to acquire a predetermined key value. The key is composed of a code specifying the layer 4 and a flag designating whether the key value is valid for an Scr port or a Dst port. The reason for designating the flags for the Src/Dst ports is that it is possible to classify a one-way traffic. For example, the class of traffic transmitted to a server can be treated as a high priority class, while the class of traffic transmitted to a client can be treated as the best effort class. As shown in steps S3 and S4 of FIG. 5, the processing is implemented on each of the Src port number and the Dst port number. The reading of a conversion key based on the Src port number is equivalent to the step S3 of FIG. 5. The reading of a conversion key based on the Dst port number is equivalent to the steps ①' and ②' of FIG. 4 and the step S4 of FIG. 5. The results of both processes mentioned above generates a key value into which a well-known port number is degenerated and a flag showing whether the key value comes from an Src port or a Dst port. This process is equivalent to the step S5 of FIG. 5 for calculating the Pory Key.

(Class determining process shown in steps ③ and ④ of FIG. 4)

Figure 5:
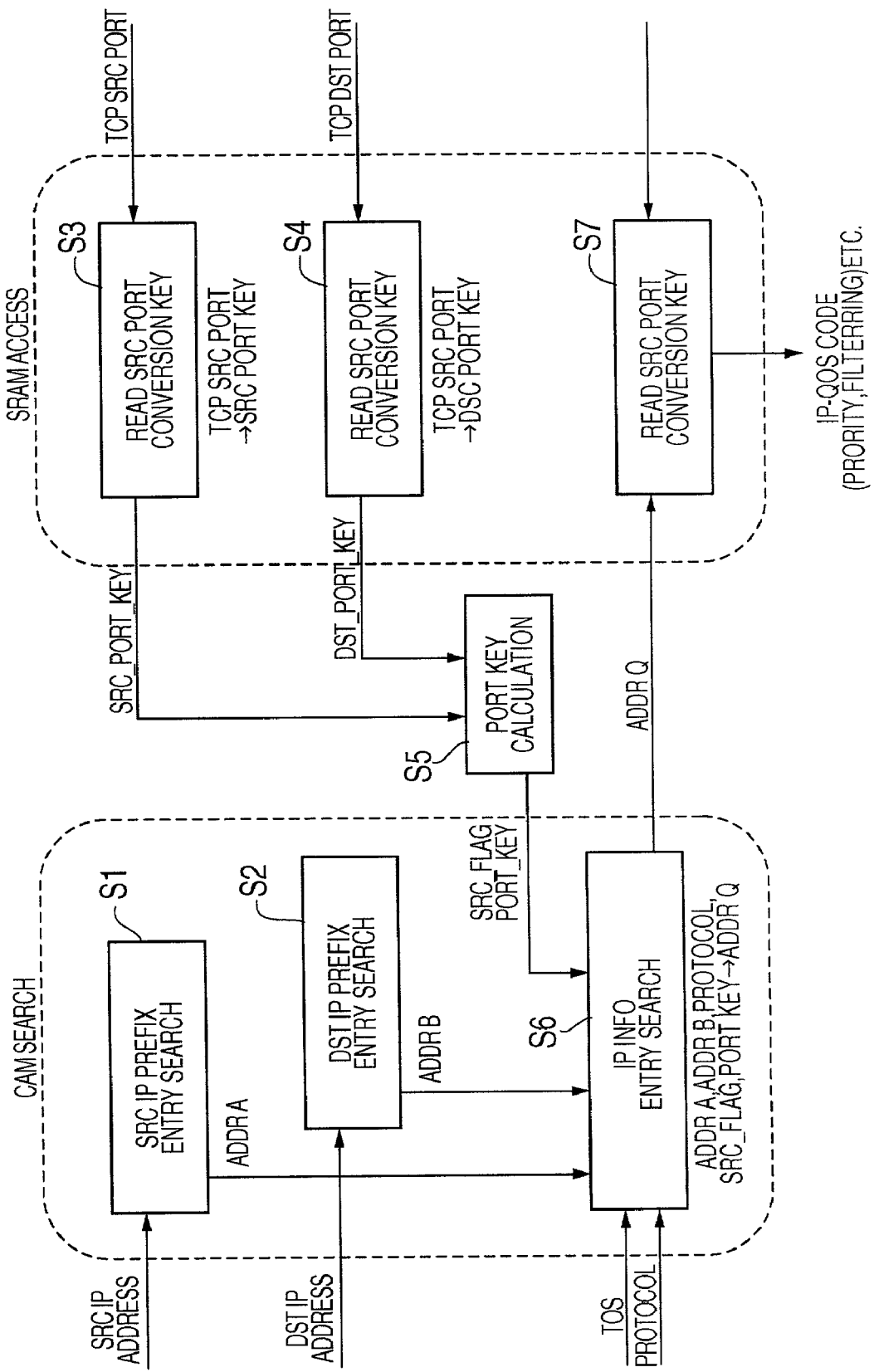
FIG. 5 s a flow chart showing a process of the class search section according to the present invention.

The CAM is searched again based on key values, TOS fields, and protocol numbers obtained in the prior process shown in the steps S1 to S5 of FIG. 5. This process is equivalent to a step S6 of FIG. 5. The combination of keys, that is, keys to be used for the searching operation as valid data, are defined as mask data for each entry in the CAM. This process can provide a CAM address (addr_Q) in which each entry is stored.

Lastly, in a step S7 of FIG. 5, the CAM address (addr_Q) is used as pointer data (address) for an external memory. As a result, ultimately required traffic class data can be obtained.

The reception-side switch interface control section 1b maps data (IP_INFO) obtained in the operation flow shown in FIG. 5 into an object and transmits to the reception-side switch interface Id. Then, the input IF cards carry out a variety of priority control.

It should be noted that when there is no hit in the registered data through the searching operation of the CAM, the CAM returns an address "0". This is defined as a class code indicating BE traffic. In the external memory, similarly, the value of the external memory at a reset time is set to be all "0s", and the area of the address "0" stores the data of BE traffic class. Thus, traffic which is not hit in the CAM searching operation is regarded as BE traffic. The details of tables stored in the CAM are shown in FIGS. 6A to 8.

FIGS. 6A and 6B show structural examples of a table stored in the memory CAM (Contents Addressable Memory) and a table of a storage area for IP Src Prefix entries. FIGS. 7A and 7b show a table of a storage area for IP Dst Prefix entries and a table of a storage area for IPINFO address entries. In addition, FIG. 8 shows a table of a storage area for IPINFO entries. In the cases of FIG. 6A to 8, reference character D indicates discard (0: normal, and 1: discard) in filtering. In addition, reference character P indicates packet priority (0: low priority, and 1: high priority); reference character route indicates an upper 1-bit route change flag (0: default route setting, and 1: lower 4-bit route field setting. Output TOS bit 9 indicates a DSCP update flag (0: non-rewriting of the TOS DSCP Field bit 7-2, and 1: implementation of rewriting thereof). Output TOS bit 8 indicates a CU update flag (0: non-rewriting of TOS CU Field bit 1 and 0, and 1: implementation of rewriting thereof). Output TOS bit 7-2 indicates a TOS DSCP (differentiated service code point) field. Output TOS bit 1-0 indicates TOS CU (currently unused) Field.

(Traffic Regulating method)

As shown in FIG. 15, in the traffic regulating method of the present invention, traffic characteristics are expressed by a token-bucket model. The token-bucket model is applied in the policing section 3d of the reception-side interface section and the shaping section 8f of the transmission-side interface section.

That is, regarding algorism for detecting traffic violation, both shaping and policing section have an equal circuit structure. FIG. 15 shows the token-bucket model. The token-bucket model has a token-containing register (bucket b) to add tokens in the bucket cyclically. In this case, tokens increase at an average rate (r). In the token adding process, the value of (WC+token) is compared with the token upper limit value b, and when the value exceeds the upper limit value b, the value b is set.

As a condition for transmitting a packet, it is necessary that a token giving a size corresponding with the size of a packet to be transmitted is present in the bucket. After the packet is transmitted, the number of token giving a length equivalent to the transmitted packet length is reduced from the present number of token. In the packet transmission, when a token enough to give a length equal to or greater than the packet length is not present in the bucket, the transmitted packet is a traffic violation object. When the condition is applied to the policing section 3d, the packet as the traffic violation object is discarded, or, for example, low priority marking is carried out. In the case of the shaping section 8f, after waiting until tokens enough to permit the transmission of the traffic violation packet are accumulated in the bucket, the packet is transmitted.

(Additional Description shown in FIG. 16)

The traffic violation occurs when there are not accumulated tokens enough to transmit a packet in the bucket. The number of tokens contained in the bucket increases at a ratio calculated by an expression: T (elapsed time)×r (average rate). When tokens accumulated in the bucket do not reach a required length even though a packet is received, the transmission of the packet is postponed until tokens reaching the required length are accumulated in the bucket.

FIG. 16 shows the operational images of policing and shaping. With reference to FIG. 16, a description will be given as follows.

(Example of Policing Operation)

Assume that packet 1 arrives at time T1. When this is not traffic violation pattern, the packet 1 is output at the same time T1'. The number of tokens left in a bucket at the output time is indicated by X1. It is supposed that packet 2 having size s2 arrives at time T2. The number of tokens necessary to output the packet 2 is equivalent to S2. However, it is supposed that the value of S2 is assumed to be greater than $\{X1+(T2-T1)\times r\}$. In this case, a traffic violation is caused. As a result, the packet 2 is discarded.

(Example of Shaping Operation)

It is supposed that packet 1 arrives at time T1. At this time, since a traffic violation is not caused, the packet 1 is output at the same time T1'. The number of tokens left in the bucket at the output time is indicated by X1.

It is supposed that packet 2 having size s2 arrives at time T2. The number of tokens necessary to output the packet 2 is equivalent to s2. However, it is supposed that $S2>\{X1+(T2-T1)\times r\}$. In this case, a traffic violation is not caused. Thus, the packet 2 is output after waiting for a time $\tau$ during which a required number of tokens are accumulated in the bucket. In this case, the time $\tau$ can be calculated by an equation $$S2 = X1 + \{(T2+\tau) - T1\} \times r.$$

(Details of Priority Control by Output Interface Cards)

Figure 10:
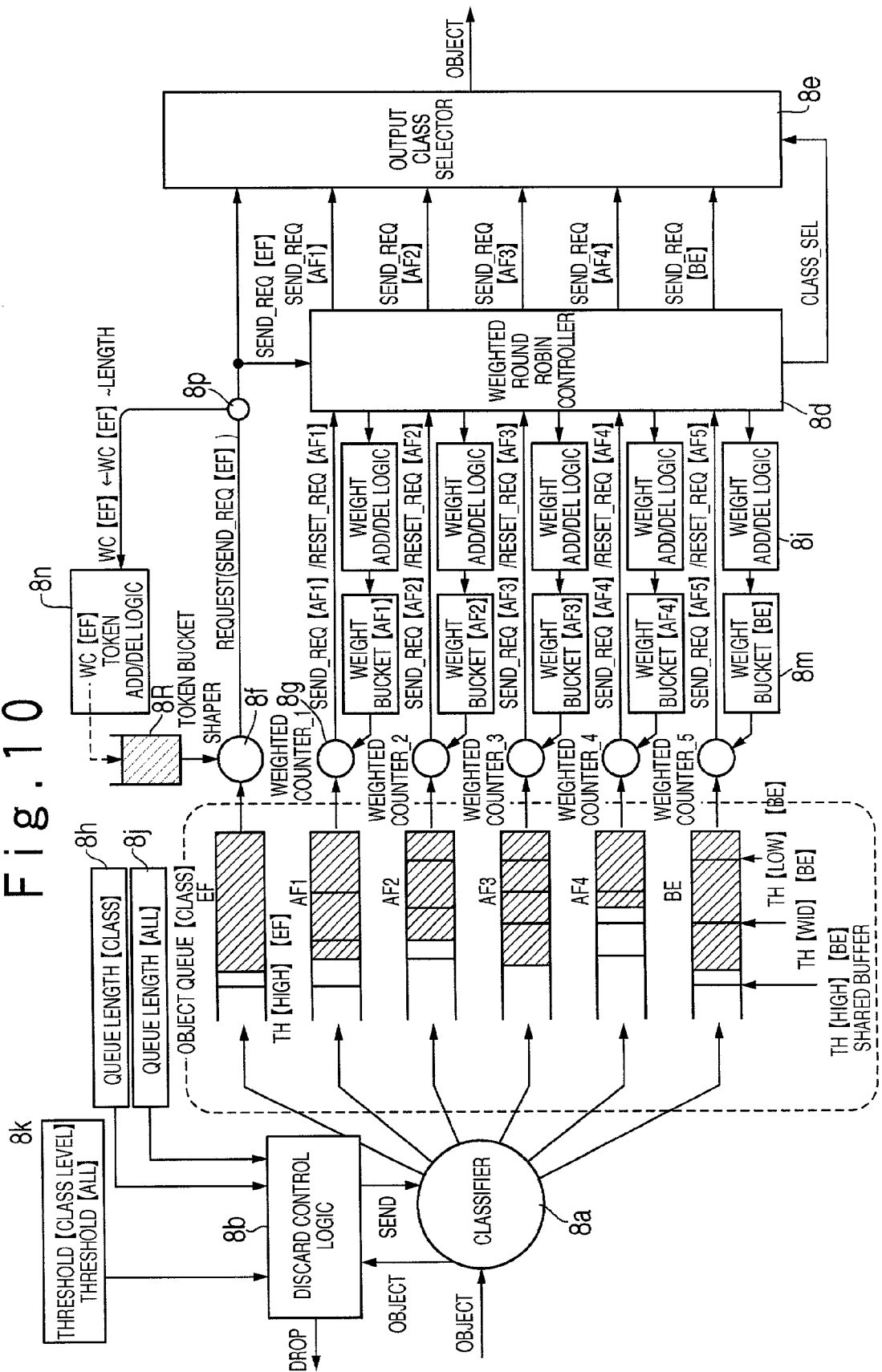
FIG. 10 is a principle diagram of an IP-QOS class scheduler according to the present invention.

With reference to FIG. 2, a description will be given of the priority control by the output interface (IF) cards. Regarding the output IF cards, an IP-QOS class scheduler 1m carries out predetermined priority control based on IP-QOS codes (traffic classes) defined in object data. The IP-QOS codes are defined as data for identifying traffic classes, and show a plurality of delay classes and a plurality of discard classes. The priority control carried out by the IP-QOS class scheduler 1m is equivalent to the steps ③ and ④ of FIG. 4. FIG. 10 shows a concept view of the priority control by the IP-QOS class scheduler 1m.

(Priority Control by the IP-QOS Class Scheduler)

The IP-QOS class scheduler 1m receives objects via a FIFO in from the transmission-side switch interface 1j and a classifier 8a classifies the objects. The classified objects are stored in a common buffer 8c selecting a queue for each class. The common buffer 8c stores the objects for each class. There are six kinds of object queues 8c in total allocated for the classes EF, AF1 to AF4, and BE. These object queues are all controlled by the common buffer 8c. The definitions of the EF, AF, and BE classes have already been provided in the description of the conventional art.

Since the EF class is regarded as a band guarantee service, precise transmission control is carried out by additionally using a shaping section 8f. A Weighted Round Robin controller 8d shown in FIG. 10 carries out selector control to an output class selector 8e so that the EF class queue is primarily read before the AF/BE class queues are read. The AF and BE class queues will be described below. The shaping section 8f has a circuit structure composed of a token-bucket model equivalent to a policing unit. The difference between a shaping section and a policing section exists only with regard to whether the transmission of the packet having a traffic violation is postponed or the packet is discarded. In this respect, as in the case of the policing section in terms of implementation, transmission process can be carried out at high speed when the packet transmission is determined by using only bits added to tokens. Furthermore, the circuit structure can be simplified.

The scheduling of the AF and BE classes is carried out by the Weighted Round Robin (WRR) system.

(Additional Explanation of WRR)

The WRR scheduling shows an expanded round robin scheduling system. According to a predetermined weight ratio, service for each class is provided. In the WRR system, each class has a counter. Each counter shows the number of cells (or packets having fixed lengths) routable by the time the counter is reset. At the reset time, the value of the counter is set to be the weight value of each class. When the counter value of a selected class is equal to or greater than "0" and the buffer includes one or more cells, one cell of the class is output to decrement the counter value. When the weight values of all of the classes are "0" or the number of cells in the buffer is "0", all of the weight counters are reset. Thus, when all classes have sufficient input traffics, the number of output cells corresponds with a weight ratio.

Each of the AF class and the BE class has a weight counter 8g and a weight value. A Weighted Round Robin controller 8d determines the objects of the AF/BE classes to be read based on the weight values and the data of the queue lengths of class queues 8c of a common buffer to control the selector. The queues of the selected AF class and BE class output the objects thereof in the order of FIFO.

(Discard Control)

Figure 11:
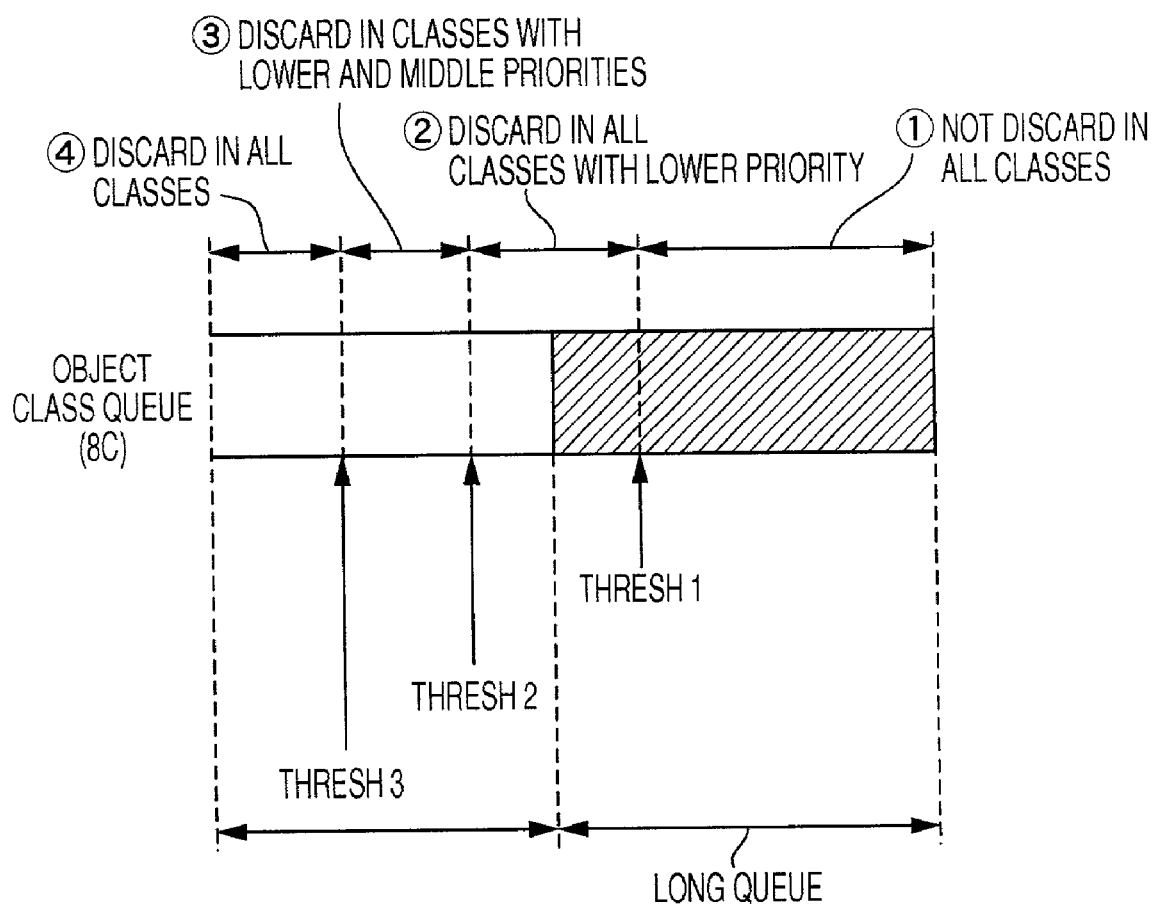
FIG. 11 is a diagram showing a discarding control logic according to the present invention.

A discard control logic unit 8b shown in FIG. 10 carries out discard control based on a logic shown in FIG. 11. The queue length 8h of each class is controlled on the basis of input object data. A discard control threshold 8k is defined for each class. Additionally, the threshold of the entire common buffer 8c is defined. The discard control logic 8b carries out discard control by comparing the queue length of each class with the thresholds 8k of each class and notifies an object to be discarded as a drop object to a transmission-side switch interface unit 1j. In addition to the discard control carried out by the above class-unit-based comparison, another discard control is carried out by comparing the sum of the entire queue lengths of the same discard class with the thresholds thereof in the overall common memory 8c. In FIG. 11, there are provided three kinds of discard classes and three thresholds corresponding therewith. Specifically, there are four discard conditions, in which (1) no discard control is carried out over all of the classes; (2) discard control is carried out to only a low priority class; (3) discard control is carried out both over a low priority class and an intermediate priority class; and (4) discard control is carried out over all of the classes. In FIG. 11, when the value of the class queue length becomes equal to or larger than the value of threshold 3, regardless of whether there is an empty area or not, all packets are discarded.

Not only in the AF-class unit but also in the entire common memories, thresholds with respect to the sum of discard classes are similarly defined to carry out discard control.

(Buffer used for the WRR System)

Figure 14:
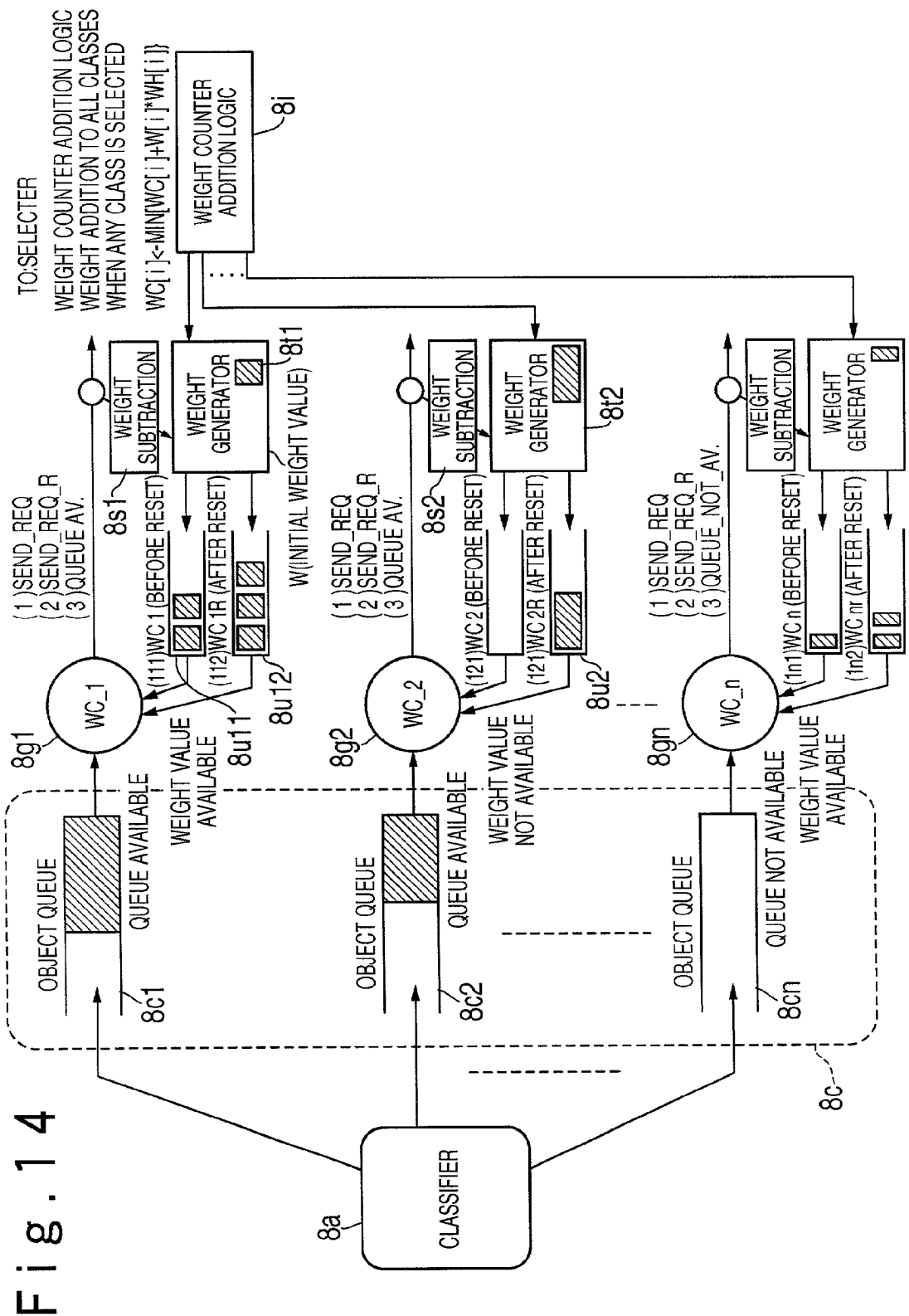
FIG. 14 is a diagram showing a main portion of a WRR object buffer according to the present invention.

FIG. 14 illustrates the main part of the buffer used for the WRR system. With respect to class object queues 8c, there are provided weight counters 111 to 1n1 controlling the present weight values and preliminary determination counters 112 to 1n2 controlling weight values after the weight counters are reset. When class determination cannot immediately be made in the first processing by the Weighted Round Robin controller, the similar class determination processing is made with the weight value of the preliminary determination weight counter obtained after the reset of the weight counter. Still, when this processing cannot make the class determination, fixed delay priority control is carried out to select the AF classes. The above class determination processings are carried out in parallel while excluding a loop processing. Thus, the processings can be carried out at high speed.

(Flow of Scheduling Operation)

Figure 12:
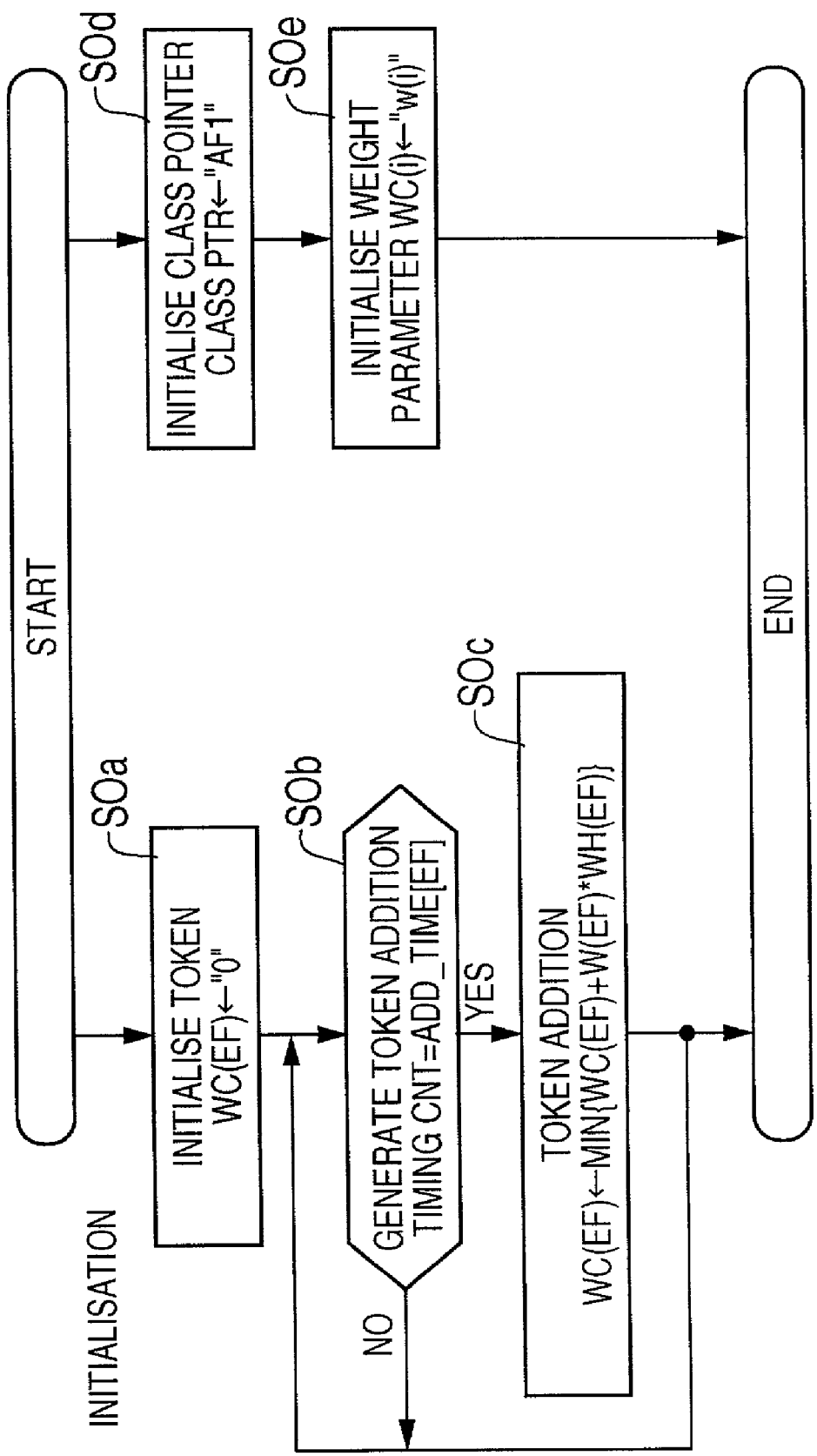
FIG. 12 is a flow chart showing a process of the scheduler according to the present invention.
Figure 13:
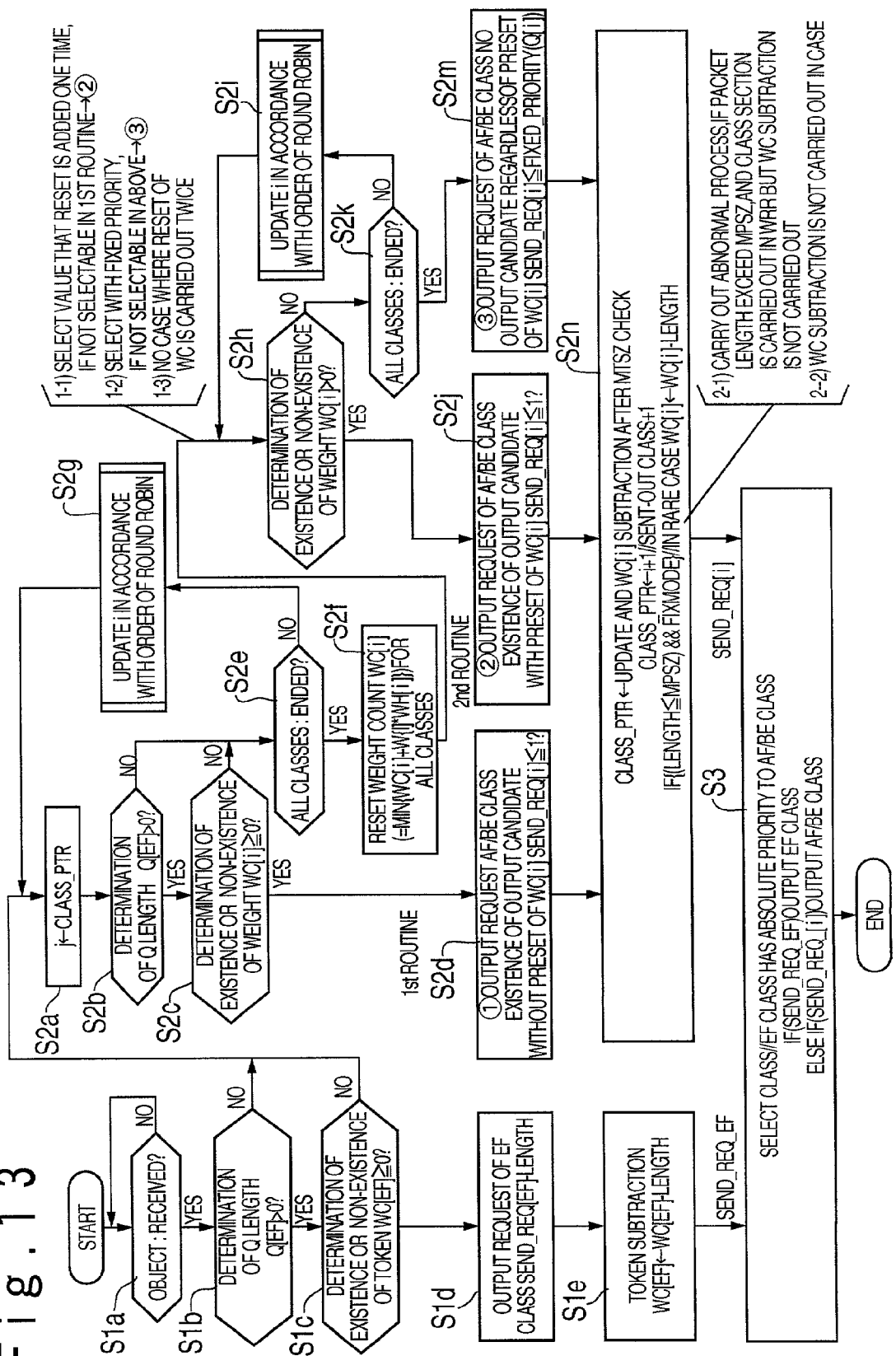
FIG. 13 is a flow chart showing a process of the scheduler according to the present invention.

Each of FIGS. 12 and 13 shows the flowchart of the above-described scheduling. As processing paths, an EF class determination path and an AF/BE class determination path exist. The EF class has absolute precedence over the AF/BE classes. Thus, when there is a transmission request for an EF-class packet, the EF class packet is selected. Only when there is no transmission request for an EF-class packet, a predetermined AF/BE class is selected.

Regarding AF/BE class determination, the Weighted Round Robin system carries out first and second determinations, and fixed delay priority control is carried out to select from the AF/BE classes as a third determination.

When the processing flows shown in FIGS. 12 and 13 are read, the following points need to be considered. In each of FIGS. 12 and 13, there are shown parameters, which will be described as follows. In the EF class, parameter W[EF] indicates an initial weight (added token value) of the EF class; parameter WH[EF] indicates an upper limit token value; parameter WC[EF] indicates a token value (variable) of the EF class; and parameter Add Time [EF] indicates a token addition cycle, which is, for example, set by an average rate under contract). In the AF/BE classes (AF1, 2, 3, and 4, and BE), parameter W[i] indicates a class initial weight value; parameter WH[i] indicates a weight-counter upper limit value; parameter WC[i] indicates a weight counter value (variable); parameter WC[i]r indicates a weight counter value (variable) after a single reset of the weight counter; parameter WC[i]r WC[i]+_class ptr indicates a pointer showing a transmitted/searched class; parameter MPSZ (Maximum Packet Size) applied in the AF/BE classes indicates a packet maximum length used as a judgement reference for rare cases; and Q[i]>0 indicates the absence or presence of an object in a queue. In addition, parameter fixed priority (Q[i]) indicates a situation in which an output request is transmitted in fixed priority order by AF1, AF1, AF2, AF3, AF4, and BE only based on the parameter Q[i]>0 regardless of a WC value. Parameter Length indicates the length of a packet and is used as a common parameter among all of the classes.

First, the process of EF-class selection will be described below.

(Cyclic Addition of Token)

In FIG. 12, as an initial processing, in step S0a, a token WC[EF] is initialized to be "0". In step S0b, a token addition timing is generated. When it is a predetermined timing (cnt==Add_time [EF]), a token is added (step S0c). An initial token W[EF] is added to the present WC[EF]. Next, the token addition cycle is, for example, set by an average rate under contract. Then, the value of WC[EF]+W[EF] is compared with the token upper limit value (WH[EF]. When the former value exceeds the latter value, the latter value is set.

(Generation of EF-class Sending Requests)

Next, as shown in FIG. 13, when an object reading request is received (step S1a), the queue length is determined (step S1b), and the presence or absence of a token is determined (step S1c).

In the above determination process, when the queue of the EF class has one or more objects and one or more tokens are present, a sending request (Send_req [EF]=ON) is routed (step S1d). Next, after a packet is transmitted, tokens giving a length equivalent to a transmitted-packet length are reduced (step S1e). In the final-stage selector processing as step S3, a sending request for the EF class as the highest priority class is accepted.

Next, an explanation will be given of the AF/BE class selection processing.

(AF/BE Class Selection Operation)

The AF/BE class selection processing will be illustrated below with reference to FIGS. 12 and 13.

(1) The values of both class pointer and weight counter are initialized (steps S0d and S0e).

(2) After an object reading request is received, only when the EF class object cannot be transmitted, that is, only when the results of the determinations obtained in steps S1b and S1d are both "No", the AF/BE class selection is carried out. In step S2b, the queue length is determined, and in step S2c, weight validity is determined.

(3) Since there is provided a plurality of AF/BE classes, the above determination processing (2) is carried out in all of the classes (step S2e). In step S2g, a class pointer (a pointer indicating a searched class) is updated in accordance with the order of Round Robin.

(4) When there is a class corresponding with sending conditions :queue length>0 and weight value>0, a sending request of the corresponding class (Send_req [Class]=ON) is routed (step S2d).

The above first to fourth operations are equivalent to class selection by a first routine.

(5) In the above retrieving processing (3), when all of the classes do not correspond with the sending conditions, an initial weight value defined for each class is added to the present weight value in all of the classes. This is a weight-counter reset processing.

(6) When class selection cannot be carried out in the first routine, that is, when there is no sending class candidate, class selection is carried out again by a weight value obtained after a single retransmitted of the weight counter reset in the processing (5). As shown in FIG. 11, there are a register (WC[class]) controlling a present weight value and, additionally, a register (WC[class]r) controlling a weight value after the single reset of the weight counter. As in the case of the processing (4), when there is a class corresponding with the sending conditions :queue length>0 and weight value>0, a sending request of the corresponding class (Send_req [Class]=ON) is output.

The above operations (5) and (6) are equivalent to class selection by a second routine.

(7) In the second routine, when class selection cannot be carried out, that is, when there is no output class candidate, as an exceptional case, fixed priority control is carried out for class selection. The purpose of the priority control is to avoid a situation in which no packet cannot be routed although there is an empty space in the capacity of a line. A class to be output is selected based on a predetermined fixed priority. For example, in the case shown in FIG. 8, class selection is carried out in the priority order of AF1, AF2, AF3, AF4, and BE. The processing does not depend on a weight value. In this case, an output candidate is determined only by determining whether an object is present or not in a queue. With this processing, two or more weight counter resets never happen in a single class selection processing. A normal determination is carried out by the Weighted Round Robin system. In addition, fixed delay priority (which is called a fixed priority mode in FIG. 13) is given to carry out an exceptional determination.

(8) An output class is selected by a sending request for the corresponding class selected in the operations (4), (6), and (7) (step S2n).

In the operation of step S2n, as a parameter, the maximum packet size MPSZ is used. This is because it is necessary to avoid a situation in which when a packet having an excessive length arrives, the value of the weight counter becomes a large negative value. For example, the maximum length of the IP packet is 64 KB, which can be unusual as the size of a transmitted packet. Statistically, a usual packet length is assumed to be a few KB at largest. Thus, arrangement is made such that it is possible to set a maximum packet length regarded as an unusual packet length. In this arrangement, when a very large packet arrives, the arrived packet length is compared with the maximum packet length. When the arrived packet length is larger than the maximum packet length, it is regarded as an exceptional case, As a result, the reduction processing of a weight counter is skipped, or the weight value is forced to be "0" to impose a certain penalty.

According to the above embodiment, in the Differentiated Service whose specifications are still in flux, the TCP layer of the OSI reference model is compared with the IP layer thereof. From IP packets, IP-QOS codes are allocated independently from the IP packet. Preferably, various kinds of communication service qualities are classified based on the IP-QOS codes. The classification of the IP-QOS codes permits traffic congestion in communication systems to be relieved.

According to the present invention, the following advantages are attained.

(1) An operator can set prioritized traffic by combining the packet data of the layer 3 and that of the layer 4 (the flow unit of each upper application).

(2) Assuming versatile operation, Weighted Round Robin Scheduling (WRRS) can be combined with a fixed priority scheduling system. Each QOS class can be selected by the fixed priority scheduling, and a minimum frequency band can also be designated.

What is claimed is:

1. A multi-layer class identifying communication apparatus, which is provided with an input interface connected to input communication lines, a switch circuit and an output interface connected to output communication lines, and has a capability of allocating a plurality of IP-QOS (Internet-.Protocol-Quality-of-Service) codes from information contained in a packet data received through one of said input communication lines, said apparatus comprising:
    an allocating section provided in said input interface, which allocates said IP-QOS codes based on a combination of information contained in an IP packet header and a TCP header defined by an OSI reference model; and
    a priority control section, which carries out a delay priority control and a discard priority control depending on a delay class and a discard class respectively, and each class corresponding to any of said IP-QOS codes allocated by said allocating section.

2. The multi-layer class identifying communication apparatus according to claim 1, said priority control section further comprises:
    a first priority control section provided in said input interface, which controls a priority of request sending for said IP packet switching by said switch unit depending on an internal delay class corresponding to any of said IP-QOS codes, and controls discarding of IP packet depending on a discard control class corresponding to any of said IP-QOS codes when available memory area of a reception side payload memory to be used for writing an input IP packet becoming short; and
    second priority control section provided in said output interface, which controls a priority of IP packet sending from respective queue buffers corresponding to any of said IP-QOS codes, and controls discarding of IP packet stored in said queue buffers depending on said IP-QOS code and a length of queue data stored.

3. The multi-layer class identifying communication apparatus according to claim 1, wherein said allocating section comprises:
    a first search means, to which header information of said IP packet and said TCP packet is input and a plurality of key information are retrieved for a second searching; and
    a second search means to be used as second searching, for retrieving an address information of external memory, in which said IP-QOS codes are registered, by using said key information retrieved from said first search means.

4. The multi-layer class identifying communication apparatus according to claim 1, further comprising:
    an IP-QOS class scheduler provided in said output interface, which carries out a first scheduling function for the highest priority IP-QOS code among said IP-QOS codes for transmitting said IP packet stored in said queue buffer corresponding to said highest priority IP-QOS code, a second scheduling function for the rest of priority IP-QOS codes for transmitting said IP packet stored in respective queue buffers corresponding to the rest of priority IP-QOS codes by control of Weighted Round Robin (WRR) scheduling method, and a fixed priority scheduling method as a third scheduling function for the priority IP-QOS code applied for said second scheduling function.

5. The multi-layer class identifying communication apparatus according to claim 4, wherein said IP-QOS class scheduler carries out said fixed priority scheduling method when no available IP packet cannot be found even after reset operation of said WRR scheduling method has been completed.

6. A multi-layer class identifying communication method, in an apparatus provided with an input interface connected to input communication lines, a switch circuit and an output interface connected to output communication lines, and has a capability of allocating a plurality of IP-QOS (Internet-Protocol-Quality-of-Service) codes from information contained in a packet data received through one of said input communication lines, said method comprising:
    allocating said IP-QOS codes based on a combination of information contained in an IP packet header and a TCP header defined by an OSI reference model by an allocating section provided in said input interface; and
    carrying out a delay priority control and a discard priority control depending on a delay class and a discard class respectively, and each class corresponding to any of said IP-QOS codes allocated by said allocating section by a priority control section.

7. The multi-layer class identifying communication method according to claim 6, said carrying out further comprises:
    controlling a priority of request sending for said IP packet switching by said switch unit depending on an internal delay class corresponding to any of said IP-QOS codes;
    controlling discarding of IP packet depending on a discard control class corresponding to any of said IP-QOS codes when available memory area of a reception side payload memory to be used for writing an input IP packet becoming short; and
    controlling a priority of IP packet sending from respective queue buffers corresponding to any of said IP-QOS codes, and controls discarding of P packet stored in said queue buffers depending on said IP-QOS code and a length of queue data stored.

8. The multi-layer class identifying communication method according to claim 6, wherein said allocating comprises:
    receiving header information of said IP packet and said TCP packet is input;
    retrieving a plurality of key information for a second searching; and
    retrieving an address information of external memory, in which said IP-QOS codes are registered, by using said retrieved key information.

9. The multi-layer class identifying communication method according to any of claim 6, further comprising:
    carrying out a first scheduling function for the highest priority IP-QOS code among said IP-QOS codes for transmitting said IP packet stored in said queue buffer corresponding to said highest priority IP-QOS code, a second scheduling function for the rest of priority IP-QOS codes for transmitting said IP packet stored in respective queue buffers corresponding to the rest of priority IP-QOS codes by control of Weighted Round Robin (WRR) scheduling method, and a fixed priority scheduling method as a third scheduling function for the priority IP-QOS code applied for said second scheduling function.

10. The multi-layer class identifying communication method according to claim 9, wherein said carrying out comprises:

carrying out said fixed priority scheduling method when no available IP packet cannot be found even after reset operation of said WRR scheduling method has been completed.

* * * * *

UNITED STATES PATENT AND TRADEMARK OFFICE
CERTIFICATE OF CORRECTION

PATENT NO. : 7,130,903 B2 Page 1 of 1
APPLICATION NO. : 09/752520
DATED : October 31, 2006
INVENTOR(S) : Michio Masuda, Toshiaki Arikawa and Kenshin Yamada It is certified that error appears in the above-identified patent and that said Letters Patent is hereby corrected as shown below:

Column 8, Line 56,
Delete "in" and insert --1n--.

Signed and Sealed this

Sixteenth Day of January, 2007

JON W. DUDAS
*Director of the United States Patent and Trademark Office*